US010135837B2

(12) United States Patent
Lewis et al.

(10) Patent No.: US 10,135,837 B2
(45) Date of Patent: Nov. 20, 2018

(54) VERSATILE AUTOSCALING FOR CONTAINERS

(71) Applicant: Amazon Technologies, Inc., Seattle, WA (US)

(72) Inventors: Christopher Thomas Lewis, Vancouver (CA); Kai Fan Tang, Port Coquitlam (CA); Farzad Moghimi, Vancouver (CA); Ahmed Usman Khalid, Vancouver (CA); Stephan Weinwurm, Vancouver (CA)

(73) Assignee: Amazon Technologies, Inc., Seattle, WA (US)

(*) Notice: Subject to any disclaimer, the term of this patent is extended or adjusted under 35 U.S.C. 154(b) by 3 days.

(21) Appl. No.: 15/194,486

(22) Filed: Jun. 27, 2016

(65) Prior Publication Data
US 2017/0339158 A1 Nov. 23, 2017

Related U.S. Application Data

(60) Provisional application No. 62/337,809, filed on May 17, 2016.

(51) Int. Cl.
*H04L 29/06* (2006.01)
*H04Q 9/02* (2006.01)
*H04L 29/08* (2006.01)

(52) U.S. Cl.
CPC .......... *H04L 63/104* (2013.01); *H04L 63/205* (2013.01); *H04L 67/1025* (2013.01); *H04Q 9/02* (2013.01)

(58) Field of Classification Search
None
See application file for complete search history.

(56) References Cited

U.S. PATENT DOCUMENTS 7,167,799 B1 * 1/2007 Dolgov ................. G08G 1/164 701/301
7,529,784 B2 * 5/2009 Kavuri ................. G06F 3/0605
(Continued)

FOREIGN PATENT DOCUMENTS

JP 2013543171 A 11/2013
JP 2014514659 A 6/2014
(Continued)

OTHER PUBLICATIONS

He et al., "Elastic Application Container: A Lightweight Approach for Cloud Resource Provisioning," 26th IEEE International Conference on Advanced Information Networking and Applications, Mar. 26, 2012, pp. 15-22.
(Continued)

*Primary Examiner* — Amir Mehrmanesh
(74) *Attorney, Agent, or Firm* — Davis Wright Tremaine LLP

(57) ABSTRACT

A scaling policy associated with a notification received by one or more computer systems is obtained. A first request is submitted, to a software container service, for a first current capacity of a resource. An amount by which to adjust a capacity of the resource is calculated, based at least in part on the scaling policy and the first current capacity. A second request is submitted, to the software container service, to adjust the capacity of the resource by the amount. A third request is submitted, to the software container service, for a second current capacity of the resource, and whether the second request has been fulfilled is determined based at least in part on a comparison between the second current capacity and the amount.

23 Claims, 10 Drawing Sheets

(56) References Cited

U.S. PATENT DOCUMENTS

| | | |
|---|---|---|
| 7,805,706 B1 | 9/2010 | Ly et al. |
| 8,484,353 B1 | 7/2013 | Johnson et al. |
| 8,621,069 B1 | 12/2013 | Tompkins |
| 8,788,855 B2 | 7/2014 | Cong et al. |
| 8,978,035 B2 | 3/2015 | McGrath et al. |
| 9,256,467 B1 | 2/2016 | Singh et al. |
| 9,405,593 B2 | 8/2016 | McGrath et al. |
| 9,477,730 B2 | 10/2016 | Liensberger et al. |
| 2003/0154279 A1 | 8/2003 | Aziz |
| 2004/0040025 A1 | 2/2004 | Lehtinen |
| 2006/0136928 A1 | 6/2006 | Crawford et al. |
| 2006/0168575 A1 | 7/2006 | Bhatt et al. |
| 2006/0168581 A1 | 7/2006 | Goger et al. |
| 2006/0277206 A1 | 12/2006 | Bailey et al. |
| 2007/0118657 A1 | 5/2007 | Kreitzer et al. |
| 2007/0245331 A1 | 10/2007 | Daynes et al. |
| 2008/0109898 A1 | 5/2008 | Mohammed et al. |
| 2008/0244611 A1 | 10/2008 | Doyle et al. |
| 2010/0153941 A1 | 6/2010 | Borissov et al. |
| 2011/0307591 A1 | 12/2011 | Sugata et al. |
| 2013/0191527 A1* | 7/2013 | Ashok ............... H04L 67/1031 709/224 |
| 2013/0297964 A1 | 11/2013 | Hegdal et al. |
| 2014/0149986 A1 | 5/2014 | S M et al. |
| 2014/0304404 A1 | 10/2014 | Marr et al. |
| 2015/0135185 A1 | 5/2015 | Sirota et al. |
| 2015/0154057 A1 | 6/2015 | McGrath et al. |
| 2015/0304176 A1 | 10/2015 | Ting et al. |
| 2015/0365385 A1 | 12/2015 | Hore |
| 2016/0019727 A1 | 1/2016 | Norton et al. |
| 2016/0134557 A1 | 5/2016 | Steinder et al. |
| 2016/0269427 A1 | 9/2016 | Haugsnes |
| 2017/0199770 A1 | 7/2017 | Peteva et al. |
| 2017/0230266 A1 | 8/2017 | Smola et al. |
| 2017/0289060 A1 | 10/2017 | Aftab et al. |

FOREIGN PATENT DOCUMENTS

| | | |
|---|---|---|
| RU | 2250490 C2 | 4/2005 |
| RU | 2481618 C2 | 5/2013 |
| WO | 2014047073 A1 | 3/2014 |

OTHER PUBLICATIONS

International Search Report and Written Opinion dated Feb. 4, 2016, International Patent Application No. PCT/US2015/059983, 12 pages.

Soltesz et al., "Container-based operating system virtualization: a scalable, high-performance alternative to hypervisors," ACM SIGOPS Operating Systems Review 41(3):275-287, Mar. 2007.

Van et al., "SLA-aware Virtual Resource Management for Cloud Infrastructures," IEEE Ninth International Conference on Computer and Information Technology, Piscataway, NJ, USA, Oct. 11, 2009, pp. 357-362.

Xavier et al., "Performance evaluation of container-based virtualization for high performance computing environments," Parallel, Distributed and Network-BasedProcessing (PDP), 2013 21st Euromicro International Conference: 233-240, Feb. 2013.

Zhao et al., "Experimental study of virtual machine migration in support of reservation of cluster resources," Proceedings of the 2nd international workshop on Virtualization technology in distributed computing: Nov. 1-8, 2007.

International Search Report and Written Opinion dated Aug. 10, 2017, International Patent Application No. PCT/US2017/032480, filed May 12, 2017, 16 pages.

Pikkarainen et al., "The impact of agile practices on communication in software development," Empirical Software Engineering 13(3):303-37, Jun. 1, 2008.

Ramamritham, "Allocation and scheduling of precedence-related periodic tasks," IEEE Transactions on Parallel and Distributed Systems 6(4):412-420, Apr. 1995.

Thiele et al., "Embedded Software in Network Processors—Models and Algorithms," Lecture Notes in Computer Science 2211:416-34, Oct. 8, 2001.

Mao et al., "Auto-scaling to minimize cost and meet application deadlines in cloud workflows," Proceedings of 2011 International Conference for High Performance Computing, Networking, Storage and Analysis, Nov. 12, 2011, 12 pages.

Australian Examination Report No. 1 for Standard Patent Applicaiton dated Apr. 14, 2018, Patent Application No. 2015346530, filed Nov. 10, 2015, 3 pages.

Korean Notice of Preliminary Rejection dated May 28, 2018, Patent Application No. 10-2017-7015815, filed Nov. 10, 2015, 4 pages.

European Communication pursuant to Article 94(3) EPC dated Sep. 9, 2018, Patent Application No. 15804248.1, filed Nov. 10, 2015, 4 pages.

Japanese Office Action dated Jul. 9, 2018, Patent Application No. 2017-524393, filed Nov. 10, 2015, 6 pages.

Russian Decision on Grant a Patent for Invention dated Jun. 26, 2018, Patent Application No. 2017116433, filed Nov. 10, 2015, 13 pages.

Uchida, "Construction of Production Environment and Deployment of Docker Containers," WEB+DB PRESS, vol. 86, pp. 106-113, May 25, 2015.

\* cited by examiner

VERSATILE AUTOSCALING FOR CONTAINERS

CROSS REFERENCE TO RELATED APPLICATION

This application incorporates by reference for all purposes the full disclosure of co-pending U.S. patent application Ser. No. 15/194,479, filed concurrently herewith, entitled "VERSATILE AUTOSCALING." This application claims priority from U.S. Provisional Application No. 62/337,809, filed on May 17, 2016, entitled "VERSATILE AUTOSCALING," the content of which is incorporated by reference herein in its entirety.

BACKGROUND

Computing resource providers leverage large-scale networks of servers and storage devices to enable their customers to execute a variety of applications and web services. This remote, distributed computing model allows the customers to efficiently and adaptively satisfy their computing needs without having to host and maintain the computing infrastructure themselves. However, with the growing use of virtual resources, customers encounter situations, such as unanticipated load and traffic spikes, to which a fixed set of virtual resources have difficulty accommodating. Moreover, automatic load balancing and resource scaling technology to this point has been limited to a small number of resource service types.

On the other hand, customers of a computing resource service provider also often utilize monitoring services to measure performance of resources and diagnose issues with resources. For instance, through these monitoring services, customers can obtain data about resource usage and use this data to make decisions on how to adjust allocations of the resources. However, such decisions are manual processes that are inadequate to react to rapid changes in load and network traffic.

BRIEF DESCRIPTION OF THE DRAWINGS

Various techniques will be described with reference to the drawings, in which.

DETAILED DESCRIPTION

Figure 1:
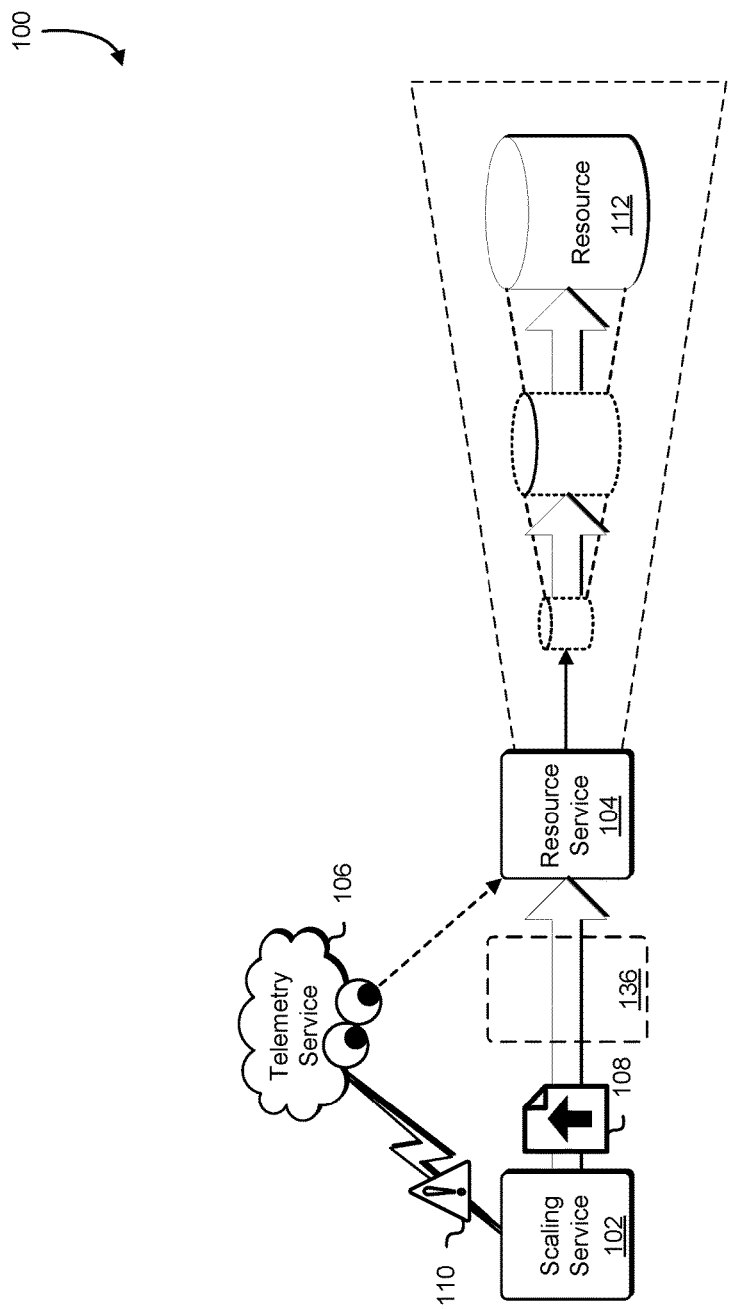
FIG. 1 illustrates an example of a scaling service in accordance with an embodiment.

In one example, the customer may use a scaling service to register many different types of resources to scale, such as database resources, load balancing resources, computing resources, etc., and the scaling service may centrally manage scaling of such resources, rather than each individual resource (or service that manages those resources) having a dedicated scaling component. The customer may register their target resources (e.g., database instances, compute instances, etc.) to be scaled by providing various identification information or meta data, for example a service name (e.g., namespace), a resource ID, and scalable dimensions of the resource (e.g., a resource may be able to scale read and write dimensions independently). During operation of the target resources, a notification is received from a telemetry service of a computing resource service provider. In this example, the telemetry service aggregates measurements of a resource allocated to a customer from a service of the computing resource service provider. The notification indicates that aggregated measurements of the resource have reached a value relative to an alarm threshold specified for a telemetry service alarm by the customer to the telemetry service. As a result of receiving the notification, a scaling policy associated with the alarm is obtained. The scaling policy includes a set of parameters that specify how a scalable target (e.g., dimension of a resource) should be scaled, as a result of the telemetry service alarm being triggered. Based on the set of parameters included in the scaling policy, a scaling action request to the service is made, the scaling action indicating an amount of change to make to the scalable target (e.g., increase/decrease the scalable dimension of the resource by a certain amount or percentage of capacity, set the scalable dimension to a fixed amount of capacity, etc.). A status request of the service is made, and a status indication from the service is received in response. Based on the status indication, a determination is made whether the scaling request has been fulfilled.

In another example, a request to register a resource dimension of a software container service is received. In response, the resource dimension is registered as a scalable target. An alarm from a telemetry service of a computing resource service provider is subsequently received, and a scaling policy associated with the alarm is obtained, based at least in part on the alarm received, with the scaling policy including a set of parameters for scaling the resource. A token representing session credentials associated with a role for authorizing fulfillment of requests to the software container service is obtained, and a first request of the software container service for a first current capacity of the resource is made. The first request may include the token. As a result of receiving the first current capacity, a new capacity for the resource is calculated based at least in part on the scaling policy and the first current capacity. A second request of the software container service is made to set a capacity of the resource to the new capacity. The second request may too include the token. Finally, a third request of the software container service is made for a second current capacity of the resource. The third request, too, may include the token. Then, based on a comparison of the third current capacity and the new capacity, a determination is made whether the second request has been fulfilled.

In the preceding and following descriptions, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Techniques described and suggested in the present disclosure improve the field of computing, specifically the field of autoscaling, using a system designed to dynamically scale a wide variety of distributed computing resource characteristics for customers of a computing resource service provider. Additionally, techniques described and suggested in the present disclosure improve user experience with distributed computing resources by providing a single set of application programming interfaces compatible for dynamically scaling multiple types of resources. Moreover, techniques described and suggested in the present disclosure are necessarily rooted in computer technology in order to overcome problems specifically arising due to the lack of availability of dynamic scaling for certain types of computing resources.

FIG. 1 illustrates an aspect of an environment 100 in which an embodiment may be practiced. As illustrated in FIG. 1, the environment 100 may include a scaling service 102 that is configured to make, in response to receiving an alarm 110 from a telemetry service 106, a scaling request 108 to a resource service 104 to scale a resource 112 up or down. The present disclosure presents a design for the scaling service 102, which is usable to manage scaling of resources for various resource services that have resources with scalable dimensions. With the scaling service 102, customers of the computing resource service providers may be able to auto-scale various resource services (besides virtual computing system services). For example, a customer can define a scaling policy for the resource 112, scale the resource 112 in response to the alarm 110 or other event, scale the resource 112 according to a schedule, view a history of scaling events, and receive notifications of scaling events.

In some examples, a "scaling policy" may refer to a policy that defines how (e.g., manner and magnitude) to scale a scalable target. In particular, a scaling policy may provide the parameters required by the scaling service 102 to calculate a new desired capacity for the scalable target. In some examples, a "scalable target" may refer to a dimension of a resource (e.g., number of software containers, number of processor cores, amount of memory, throughput of a storage device, bandwidth of a network, depth of a message queue, etc.) that can be programmatically scaled (e.g., via a command to an application programming interface (API), remote procedure call, etc.). A scalable target may be associated with zero or more scaling policies. The scaling service 102 of the present disclosure provides a number of benefits. For example, a customer need only learn and use a single set of APIs to scale multiple different resource types. Furthermore, as more advanced forms of scaling, such as target utilization scaling, become popular, the scaling service may be adapted to perform nontrivial calculations for scaling (e.g., different types of scaling policies may have different calculation algorithms, concurrent executions of policies coordinated and prioritized) and may be adapted to scale new web service types.

The scaling service 102 may allow customers of a computing resource service provider to associate scaling policies with the resource service, such as a software container service described in U.S. patent application Ser. No. 14/538,663, filed Nov. 11, 2014, entitled "SYSTEM FOR MANAGING AND SCHEDULING CONTAINERS," incorporated by reference. The scaling policies may be triggered by a notification from another service or application, such as the triggering of an alarm configured with a telemetry service such as the telemetry service 106. In some embodiments, a scaling policy is executed on demand by the customer, such as by using an ExecuteScalingPolicy( ) API, to execute a scaling policy. However, in some embodiments of the scaling service 102 there is a concept of cooldown. In some examples, a "cooldown" may refer to a time period that suspends scaling after an action has been taken. The cooldown acts as a throttle to limit the frequency of scaling attempts. In some embodiments, a default cooldown period (e.g., 30-seconds) applies if the customer has not specified one.

The scaling service 102 may also maintain a detailed history/log describing the reason a scaling request was made to the resource service 104 and whether the scaling request succeeded or didn't succeed in scaling the resource 112. In this manner, the scaling service 102 relieves customers from having to manually scale their services in response to changing demands.

In embodiments, customers are enabled by the service provider to configure the scaling service 102 through a command line interface (CLI), a software development kit (SDK), an API (e.g., RegisterScalableResource( ) PutScalingPolicy( ) etc.), or a management console in a graphical user interface. Examples of such a management console can be seen in FIGS. 3-5.

The scaling service 102 may be a service configured to automatically and dynamically manage computing resources that might be subject to demand fluctuation. For example, the autoscaling service may respond to alarms or other notifications from external applications, such as the alarm 110 transmitted to the scaling service 102 by the telemetry service 106, to cause another service to adjust and/or allocate resources.

An advantage of the scaling service 102 of the present disclosure is not simply that it is able to cause a resource service to scale a resource up or down, but that the scaling service 102 is not specifically configured by the computing resource service provider to scale any particular resource; that is, the scaling service 102 is versatile in that it allows the customer to register and configure which resource types to scale or automatically scale, what are the scalable dimensions, in which direction the resource types should be scaled, and which events should trigger autoscaling. For example, the customer may use scaling service 102 to register many different types of resources to scale, such as database resources, load balancing resources, computing resources, etc. In this example the scaling service 102 centrally manages scaling of such resources, rather than each individual resource (or service that manages those resources) having a dedicated scaling component. The customer may register their target resources to be scaled by providing various identification information or meta data, for example a service namespace or name, a resource ID, and scalable dimensions of the resource (e.g., a resource may be able to scale read and write dimensions independently). The customer may define an event (e.g., parameters for triggering an alarm of the telemetry service, occurrence of a time scheduled with a scheduling service, etc.) external to the scaling service 102 and an occurrence of the event may cause the scaling service 102 to retrieve a customer-defined scaling policy, which dictates what actions the scaling service 102 should take in response to the event. In some cases, the event may be triggered based on metrics of a service different from the service to be scaled. For example, a load that exceeds a threshold at a first service may trigger an alarm to be sent to the scaling service 102, and the scaling policy corresponding to the alarm may state that one or more resources from a second service should be increased. As a more detailed example, a customer may operate, independently, a video streaming site and a site for storing digital photographs. At certain times of day, the video streaming site may experience demand that exceeds a threshold, which causes an alarm to be sent to the scaling service 102. The customer may have a scaling policy that states that in such an event, resources for the video streaming site should be increased in order to accommodate the increased demand, but, in order to offset the cost of increasing the demand for the video streaming site, resources for the digital photograph site may be correspondingly decreased. In this example, the customer may have determined that the decrease in digital photograph site resources would not significantly affect users of that site.

Regarding scaling policies, a scaling policy defines "how" to scale a scalable target (i.e., the resource 112). In particular, the scaling policy provides the parameters required by the scaling service 102 to calculate a new desired capacity for the scalable target. There are different types of scaling policies, and a scalable target may be assigned having zero or more scaling policies. The scaling policy may specify scaling activities to perform as a result of the scaling policy being executed (e.g., triggered by the alarm 110). A scaling activity represents an action taken to increase or decrease the desired capacity of a scalable target at a certain time. A chronological sequence of scaling activities for a scalable target represents its scaling history, which may be logged for later reference by a customer-owner of the scalable target. As described in the present disclosure, there may be cases where custom scaling parameters are needed to handle service specificity. For example, for in-memory cache service cluster scaling, customers should be able to specify whether to apply changes to a cache node count immediately or apply changes during the next maintenance window. The scaling service 102 may allow parameters specific to the particular resource service 104 to be specified in scaling policies (e.g., in a JSON map). The use of these specific parameters may be restricted to service-specific properties and/or functions. More details about the request parameters and response elements may be found in the description of FIGS. 2 and 6, below.

The resource service 104 may be any service provided, individually or as a combination of services, by a computing resource service provider to customers that has scalable resources. For example, the resource service 104 may be one or more of a virtual computing system service, a software container service, a block-level data storage service, an on-demand data storage service, a notification service, a message service, a streaming service, a messaging service, or a database service. A scalable resource being a computing resource having a dimension that may be increased or decreased in order to affect performance. For example, a virtual computing system service is a scalable resource because the quantity of virtual machines allocated to a customer, the processor/compute (computational) power assigned to a virtual machine, and virtual memory allocated to a virtual machine are dimensions that may be increased or decreased. Likewise, a database service has dimensions, such as read capacity throughput and write capacity throughput, which also may be increased or decreased, and so on. As another example, a messaging service for publishing messages from one computing entity to another computing entity has a queue size as a scalable dimension. A storage service has, among other scalable dimensions, volume size, block size, and throughput.

Services provided by the computing resource service provider may include one or more interfaces that enable the customer or other authorized entities to submit requests via, for example, appropriately configured API calls. In addition, each of the services may include one or more service interfaces that enable the services to access each other (e.g., to enable a virtual computer system of the virtual computer system service to store data in or retrieve data from an on-demand data storage service and/or access one or more black-level data storage devices provided by a block-lever data storage service). Each of the service interfaces may also provide secured and/or protected access to each other via encryption keys and/or other such secured and/or protected access methods, thereby enabling secure and/or protected access between them. Collections of services operating in concert as a distributed computer system may have a single frontend interface and/or multiple interfaces between the elements of the distributed computer system.

The resource 112 is intended to represent a resource provided by the resource service 104. For example, if the resource service 104 is a database service, the resource 112 may be a database. If the resource service 104 is a virtual computing system service, the resource 112 may be a cluster of virtual machine instances. As another example, if the resource service 104 is a message queuing service, the resource 112 may represent the message queue. In the particular example depicted in FIG. 1, the resource 112 is increasing in response to the alarm 110 sent to the scaling service 102. However, it is contemplated that what goes up may come down, and that a different alarm may trigger the scaling service 1022, thereby causing the resource service 104 to decrease the resources 112. It must also be noted that dimensions other than "size" may also be scaled. For example, the resource 112 may represent a set of tasks running in a cluster of container instances, such as the software container service tasks described in U.S. patent application Ser. No. 14/538,663, filed Nov. 11, 2014, entitled "SYSTEM FOR MANAGING AND SCHEDULING CONTAINERS," incorporated by reference, and the dimension to be increased or decreased may be the quantity of tasks in the set of tasks; that is, the resource service 104 may be requested to increase or decrease the number of tasks to run.

The scaling service 102 may allow customers of the computing resource service provider to associate a scaling policy with an telemetry service alarm of the telemetry service 106 using an API call (e.g., PutMetricAlarm( ), the telemetry service console, or with a telemetry service event using an API call (e.g., PutRule( ) so that this policy can be triggered when the alarm or event fires.

In most cases, customers would set up one scale-out policy and one scale-in policy (or one scale-up policy and one scale-down policy) for a resource service in order to manage both increase and decrease in demand; but in embodiments, customers can also choose to set up multiple scale-out or scale-in policies for the same resource service. In some examples, the term "scale-out" may refer to the concept of replicating/creating additional resources (e.g., adding additional software containers) of the type being scaled. Likewise, the term "scale-in" may refer to the concept of reducing/terminating a number of resources (e.g., terminating container instances) of the type being scaled. Similarly, the term "scale-up" may refer to increasing a magnitude of a resource (e.g., increasing the size of a storage volume). As well, the term "scale-down" may refer to decreasing a magnitude of a resource (e.g., reducing a read throughput of a database service table).

As noted, the scaling service may be caused to perform one or more actions in response to receiving a notification from an external application or service. In some embodiments, that external application or service include a telemetry service, such as the telemetry service 106. The telemetry service 106 may be a service configured to aggregate control group measurements (e.g., information about the state of the resources 112 of the resource service 104) and container logs, and initiate alarm actions in response to triggering customer-defined alarms. Control group measurements include information such as the amount of memory used by processes running under the resource service 104, number of times that a process running under the resource service 104 triggered a page fault, central processing unit usage by processes running under the resource service 104, time during which the central processing units were executing system calls on behalf of processes running under the resource service 104, number of reads and writes to the resource 112, network traffic used by the resource service 104 on behalf of the customer, and number of input/output operations queued for the resource service 104. The telemetry service 106 may allow the customer to configure the telemetry service 106 to send the alarm 110 to another application or service (e.g., the scaling service 102) when certain control group measurements reach a value relative to a threshold.

The scaling request 108 may be a request to the resource service 104 to increase or decrease a scalable dimension for the resource 112. Whether to increase or decrease the scalable dimension and how to make the request may be dictated by the scaling policy configured by the customer at the scaling service 102 that corresponds to the alarm 110. The scaling request 108 may be in the form of an API call to the resource service 104. It must be noted that in some embodiments, the resource service 104 need not be a service provided by the same computing resource service provider as the scaling service 102 and/or the telemetry service 106. That is, the computing resource service provider that provides the scaling service 102 may further provide a gateway service 138 that enables API calls to be exchanged between the scaling service 102 and services provided by other computing resource service providers. Thus, the gateway service 138 is illustrated as a possible component through which the scaling request 108 may pass. In these embodiments, the alarm or other notification that triggers the scaling policy can also be provided by a telemetry or other service of a third party (not shown in the environment 100) and also pass through the gateway service 138 to the scaling service 102.

The alarm 110 represents a notification sent to the scaling service 102 in response to the occurrence of specified conditions. For example, the telemetry service 106 may be configured, by a customer to whom the resource 112 is allocated, to monitor a certain metric regarding demand for the resource 112 of the resource service 104, and if the demand exceeds a threshold specified by the customer, send the alarm 110 to the scaling service 102. Note that while the alarm 110 is depicted as coming from the telemetry service 106, it is contemplated that alarms may be received from other applications and services. For example, a scheduler service (not pictured) may be configured to send an alarm at 8:00 a.m. Monday through Friday that triggers the scaling service 102 to cause the resource service 104 to increase the resource 112 by a certain amount, and send an alarm at nine p.m. Tuesday through Saturday that triggers the scaling service 102 to cause the resource service 104 to decrease the resource 112 by the certain amount.

Thus, the scaling service 102 may allow customers to set up scaling policies, which causes the customers' resources to scale-up (increase) and scale-down (decrease) scalable dimensions of a scalable resource. In some embodiments, in addition to scaling actions of scaling up and scaling down, the scaling policies of the scaling service 102 can cause other actions to be performed, such as checking the health of the resource, causing an unhealthy resource to be replaced, attaching a resource to a load balancer, and so on.

The scaling service 102 may be compatible with resources that are scalable in the sense that dimensions (i.e., characteristics) of the resource can be increased or decreased by the customer. Thus, the scaling service 102 improves the customer experience by providing one interface for scaling various resource services which traditionally have not been automatically scalable, such as software container services, database services, and data streaming services. Thus, the scaling service 102 may allow customers to set up scaling policies and define scaling parameters for various types of resource services.

In this manner, the scaling service 102 does not need to be adapted to support scaling different types of resources of different types of services. Determination of what and how to scale is made based on a scaling policy, and/or registering scalable resources with the scaling service 102, which may be provided by the customer-owner of the scalable resource. Each resource must be uniquely distinguishable from other resources; a resource may have a unique identifier (ID) that can be used to identify the specific resource. Each resource may have some measure of capacity units. For example, a software container service software container may have a measure of the number of tasks running in a service construct of the software container service. As another example, a streaming service stream may have a measure of the number of shards in the stream. As still another example, a database service table may have a measure of the number of read and write capacity units.

A "software container" (also referred to as a "container" for short) may be an isolated user space instance. That is, a software container may be a lightweight, virtualized instance running under a computer system instance that includes programs, data, and system libraries. A difference between a software container and a virtual machine is that, while the hypervisor of a virtual machine abstracts an entire hardware device, the software container engine may just abstract the operating system kernel. While software containers run in isolation from each other, they can share the same binaries and library files as needed. Consequently, the software container can be more efficient than a virtual machine in terms of resource usage. In an environment where a customer needs to run multiple copies of the same application, more applications can be run simultaneously in software containers than running the applications simultaneously in separate virtual machines using the same hardware. A software container may run in a container instance. In some examples, a "container instance" may refer to a computer system instance, virtual or non-virtual (e.g., a physical computer system running an operating system), that is configured to launch and run software containers. Thus, the container instances may be virtual machines configured to launch and execute the software containers.

When a software container is run, the running program (i.e., the process) is isolated from other processes running in the same computer system instance. Thus, multiple software containers may each run under an operating system (e.g., using memory, CPU, and storage allocated by the operating system) of a container instance and execute in isolation from each other (e.g., each container may have an isolated view of the file system of the operating system). Each of the containers may have its own namespace, and applications running within the containers may be isolated by only having access to resources available to the container namespace. In this manner, containers may be an effective way to run one or more single applications within their own namespace without overhead associated with starting and maintaining virtual machines for running separate user space instances. Examples of systems for managing software containers include the Docker container engine and the CoreOS Rocket container engine.

One or more container instances may comprise a cluster. In some examples, "cluster" may refer to a set of one or more container instances that have been registered to (i.e., as being associated with) a particular cluster. The cluster may be associated with an account of a customer of a computing resource service provider that may be providing a software container service to the customer for running the software containers.

Thus, scalable services may all have the concept of capacity in one form or another. The scaling service 102 may have a single interface that allows customers to specify, for a resource with a particular ID, to increase or decrease this amount of capacity by a certain percentage or absolute amount in response to execution of the scaling policy. In this manner, customers may specify resource scaling for different resource types from the same interface. A customer may attach a scaling policy to an alarm of the telemetry service 106, or, in some embodiments, the customer can attach the scaling policy to a telemetry service event (as described in the present disclosure). In this manner, the computing resource service provider need not be billed separate scaling services for each of the different scalable service provided.

Figure 8:
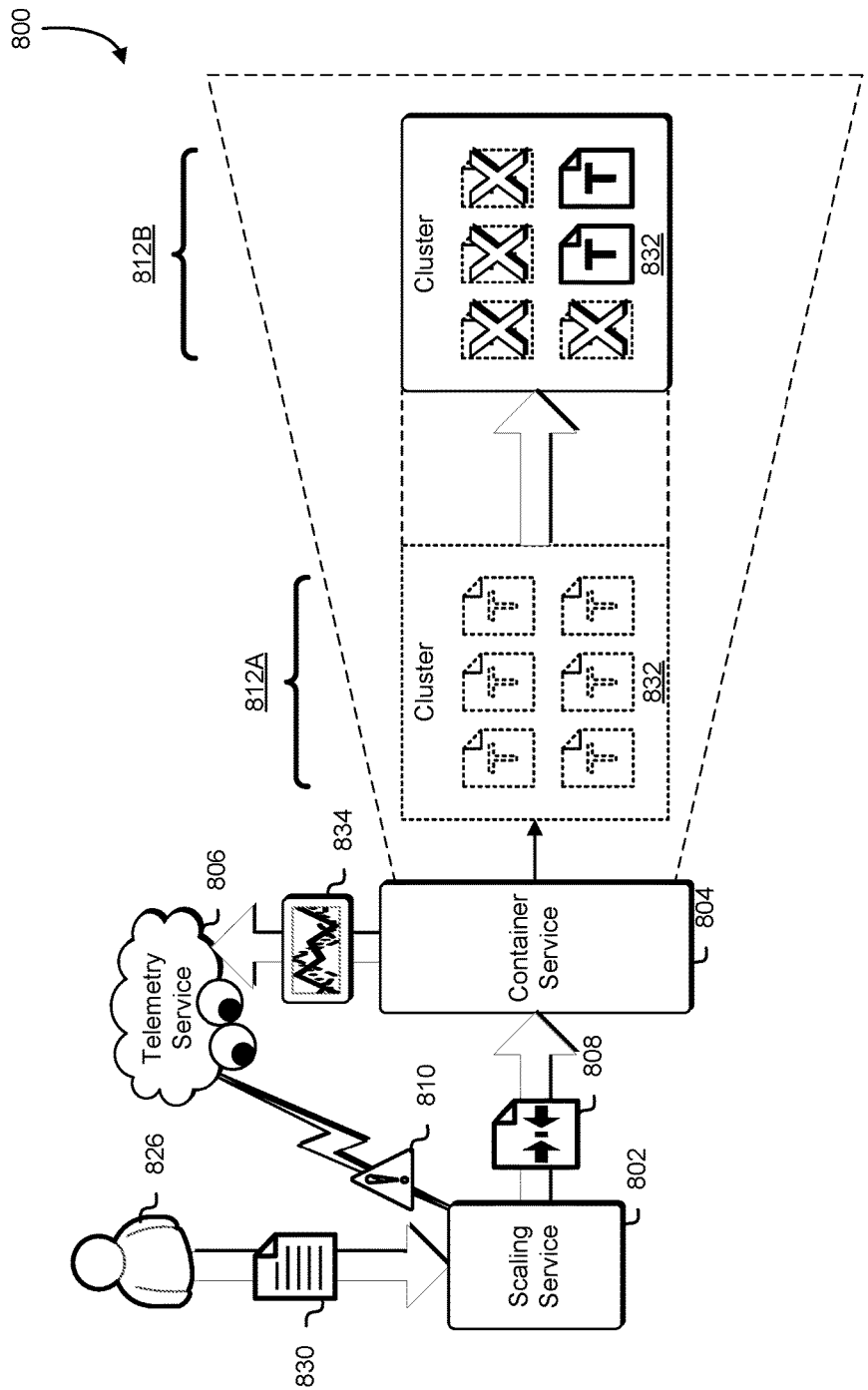
FIG. 8 illustrates an example of scaling a software container service in accordance with an embodiment.

For a software container service, such as the software container service 804 of FIG. 8, a service construct may be the scalable resource. In some examples, a "service construct" may refer to a group of tasks/containers configured by the customer to run as an application service (e.g., for performing particular workload processing). One or more service constructs may run in a cluster of container instances. The customer may specify a desired task count that indicates a number of tasks that should be the executing simultaneously in the service construct. Thus, the desired task count may be a scalable dimension of the service construct resource.

Regarding scaling a database service resource dimension (e.g., provisioned throughput scaling), unlike a service construct task count, the database service may not distinguish between "desired" and "actual" capacity for the provisioned throughput of a table at the API level (i.e., the database service may not distinguish between what the provisioned throughput is going to be and what it actually is). To the scaling service, the current provisioned throughput of a table is both the desired and the actual capacity.

Figure 2:
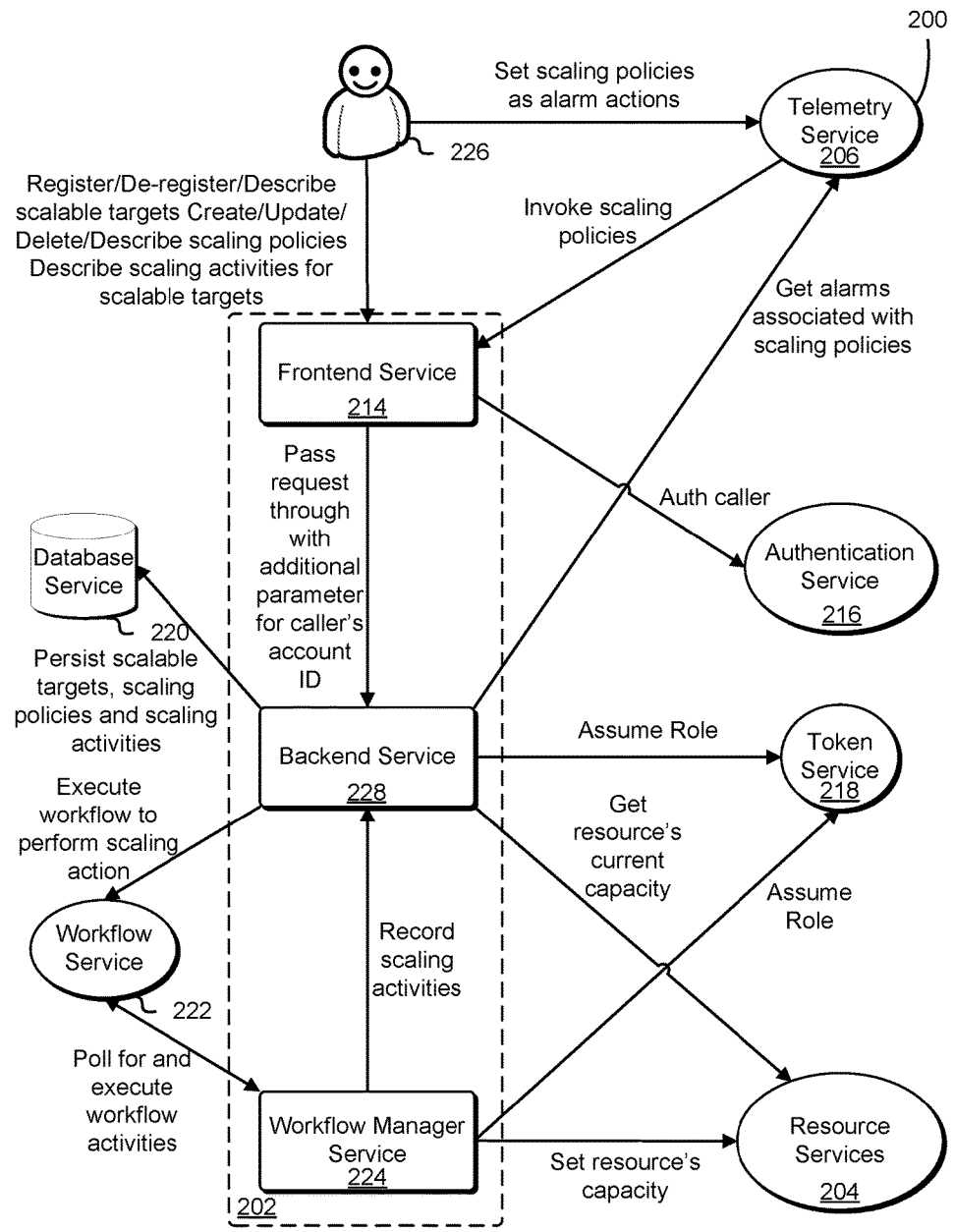
FIG. 2 illustrates an example of architecture of the scaling service in accordance with an embodiment.

As shown in FIG. 2, a scaling service 202 may interact with other services of the computing resource service provider. FIG. 2 illustrates system architecture of a scaling service in an environment 200 in which an embodiment may be practiced. As illustrated in FIG. 2, the environment 200 may include a scaling service 202 comprising a scaling service frontend 214, a scaling service backend 228, and a scaling service workflow manager 224. A customer 226 may set scaling policies via the scaling service frontend 214 and also set alarm actions with a telemetry service 206 that trigger the scaling policies. Calls made to the scaling service frontend 214 may be authenticated by an authentication service 216. Scaling policies may be stored with the database service 220 by the scaling service backend 228, and scaling actions may be initiated through a scaling service workflow manager 224 by the scaling service backend 228. The customer 226 may specify, via a policy/role management service (not pictured), a role to be assigned to the scaling service 202, and the scaling service 202 may obtain a token from a token service 218 as proof that the scaling service 202 has been granted that role. Upon triggering a scaling policy, the scaling service 202 may obtain a resource's current capacity and set the resource's capacity for its respective resource service of the resource services 204 under the specified role.

The scaling service frontend 214 may be the frontend for the scaling service 202. That is, the scaling service frontend 214 provides the customer 226 with a single endpoint. The customer 226 may use an interface console or call an API to instruct the scaling service 202 to create scaling policies for their resources. That is, the customer 226 may submit scaling service API requests to the scaling service frontend 214. The scaling service frontend 214 may pass the requests through to the scaling service backend 228. For example, the customer 226 may use a service interface (i.e., via the scaling service frontend 214) to register a scalable target. The scalable target may refer to a dimension of the resource that the customer 226 may scale. In some examples, the scalable target may include a service ID or namespace, a resource ID, and/or a dimension name or identifier such that the scalable target uniquely identifies which dimension of the particular resource of the particular service to scale. Once the scalable target is registered, the customer 226 may create a scaling policy to be associated with the scalable target.

The scaling service backend 228 may be the backend data and/or control plane for the scaling service 202. The scaling service backend 228 may receive and process scaling requests (e.g., via a control plane) and create, read, update, and delete API requests (e.g., via a data plane). For scaling requests, the scaling service backend 228 may calculate a new desired capacity and launch a scaling workflow via the workflow service 222, which in itself may interact with the target resource and use a control plane service to track and record the interaction. Storage of the policies, scaling activities, and identities of scalable targets may be stored with a database service 220, and then a workflow service 222 may be used to orchestrate the scaling workflow.

The computing resource service provider may provide general APIs for managing the scaling of various resource service types so that the customer 226 need learn only one API to scale all their resources. Examples of API functions supported by the scaling service frontend 214 include:

| API | Description | Request Parameters | Response Elements |
|---|---|---|---|
| RegisterScalableTarget( ) | create-update API for registering scalable targets | serviceNamespace, resourceid, scalableDimension, minCapacity, maxCapacity, roleURN | None |
| DescribeScalableTargets( ) | | serviceNamespace, resourceids, scalableDimension, maxResults, nextToken | scalableTargets, nextToken |
| DeregisterScalableTarget( ) | | serviceNamespace, resourceid, scalableDimension | None |
| PutScalingPolicy( ) | create-update API for scaling policies, which can only be created for registered scalable targets | policyName, serviceNamespace, resourceId, scalableDimension, policyType, simpleScalingPolicyConfiguration, stepScalingPolicyConfiguration, targetUtilizationScalingPolicyConfiguration | policyURN |
| DescribeScalingPolicies( ) | | policyNames, serviceNamespace, resourceid, scalableDimension, maxResults, nextToken | scalingPolicies, nextToken |
| DeleteScalingPolicy( ) | | policyName, serviceNamespace, resourceId, scalableDimension | None |
| DescribeScalingActivities( ) | | activityIds, serviceNamespace, resourceId, scalableDimension, maxResults, nextToken | scalingActivities, nextToken |

Further details on the API functions are discussed below in conjunction with FIG. 6.

In order for the scaling service 202 to determine which resource to scale, a resource must be uniquely identifiable and have one or more scalability measures (e.g., scalable dimensions) that may be independently increased or decreased. That is, the customer 226 must identify the resource they want to auto-scale. For example, in some implementations, a resource can be identified by a URN. Additionally or alternatively, in some implementations, a resource can be identified by a service name specified by the customer 226. One example of a URN format is shown below:

urn:partition:service:region:account-id:resource

A resource may be unambiguously identified based on the partition, service, region, account ID, and/or resource identifier, and the combination of service namespace, resource ID and scalable dimension may uniquely identify a scalable target. Among these pieces of information, the scaling service may only require the service and resource identifier from the customer 226. For example, the customer 226 may provide the following information to the scaling service 202: Service Namespace (one of the service namespaces listed in web service documentation) and Resource ID (a string uniquely identifying a resource within the service namespace. The Resource ID format should follow the resource portion in the URN format; in such a case, if the service has an URN, that may be sufficient to construct the URN for the Resource ID as needed). Using a combination of service namespace and resource ID may have advantages over using URNs. For example, the customer 226 may describe the customer's resources registered in the scaling service 202 with reference to service namespace and resource ID or by service namespace only, and, in this way, the customer 226 need not construct or keep track of URNs. Such an implementation would then accommodate resource services that do not use URNs.

The following is an example for software container service task scaling:

"serviceNamespace": "containerservice"
"resourceid": "service/my-cluster/my-service"

The following in an example for the database service 220 provisioned throughput scaling:

"serviceNamespace": "databaseservice"
"resourceid": "table/my-table"

In some embodiments, the customer 226 can specify an URN in the resource ID, and the system will assume that the service namespace is the one in the URN. In some implementations, alternative to or in addition to individual resource scaling, the scaling service 202 provides application scaling. In some examples, "application scaling" may refer to scaling a group of related resources that form an application stack of the customer 226. For the purpose of scaling, the group of related resources, itself, would be a resource and would be uniquely identifiable. Therefore, the concepts of service namespace and resource ID also apply to application scaling.

However, if the customer 226 only intends to scale one resource, the scaling service need not have to know that it belongs to a group. On the other hand, if the intention is to scale the group as a whole, the customer 226 should consider scaling the group versus scaling the resources in it. It should be the job of the scaling service 202 to determine how to scale the resources. Regarding scalable dimensions, identifying the resource, alone, may not be sufficient to determine what dimension of the resource to scale. For example, as noted above, the customer 226 may separately scale the read and write provisioned throughputs of a database service table. In general, a resource may have more than one scalable dimension that may be changed independently. Therefore, in addition to service namespace and resource ID, customers may need to specify a scalable dimension. Here is an example for software container service task scaling:

```
"scalableDimension": "containerservice: service:
DesiredCount"
```

The scaling service 202 may require the customer 226 to specify which "dimension" of a resource the customer 226 wants to scale. As an example, a database service table, or global secondary index (GSI), may have read and write provisioned throughputs that may be changed independently and that may be regarded as scalable dimensions. For database service tables and GSIs, there may be at least two scalable dimensions for read and write provisioned throughputs respectively. The customer 226 may define maximum and minimum boundaries and scaling policies per table/GSI and per scalable dimension. In some embodiments, the database service 220 is limited to storing a certain number (e.g., four) provisioned throughput decreases for a given table in a particular time frame (e.g., during a single calendar day). Here is an example for the database service 220 provisioned throughput scaling:

```
"scalableDimension": "databaseservice:table:
ReadCapacityUnits"
```

The convention being used in this embodiment is "<service-namespace>:<resource-type>:<property>." However, it is contemplated that other formats may be used. The concept of "scalable dimension" may also apply to groups of resources, and each group of resources may have its own scalability measures.

Another example of a scalable resource service is an in-memory cache service. An in-memory cache service may be a distributed in-memory cache environment for providing general-purpose distributed memory caching. The in-memory cache service may improve performance of applications by caching data in fast, in-memory caches to reduce the number of times and external data source (e.g., database) must be read. An in-memory cache service may include cache clusters comprising cache nodes. To scale an in-memory cache service cluster, the scaling service 202 may change the number of cache nodes in the cache cluster. For example, in an in-memory cache service, the customer 226 can choose whether to change the number of cache nodes immediately or change the number of cache nodes during the next maintenance window. The in-memory cache service may support cache node removal policies so that it can dynamically determine which cache nodes to remove.

Determination of whether to trigger a scaling policy and the scaling service 202 may be made by a source external to the scaling service 202, such as the telemetry service 206. That is, a scaling policy may be attached to a telemetry service alarm of the telemetry service 206 by the customer 226, and the scaling policy may be triggered by the telemetry service alarm. For example, the customer 226 could create a telemetry service alarm with the telemetry service 206 on any measurement being aggregated by the telemetry service (although, typically the measurement will be one that is relevant to the resource that the scaling service 202 will be scaling). More specifically, if the resource to be scaled were a software container service software container, one metric that could be used would be the processor utilization across the virtual computing system service instances in which the software containers are running. At the telemetry service 206, one or more thresholds may be specified for the telemetry service alarm; for example, the customer 226 may specify that the telemetry service alarm should fire when processor utilization reaches 50 percent utilization. Once the telemetry service alarm is set up, the customer 226 may attach any scaling policy to it, such that when the alarm fires (i.e., the measurement value exceeds the threshold), it may trigger the scaling policy.

The telemetry service 206 may call the scaling service 202 to invoke a scaling policy when an associated alarm enters a state that triggers the scaling policy. In some cases, the telemetry service 206 may periodically (e.g., every minute) invoke the scaling policy for as long as the alarm remains in that state. In some embodiments, the telemetry service 206 invoke a scaling policy only once per alarm state, and then a workflow may be performed after performing a scaling action to check the alarm state to determine if further scaling is needed.

As a result of the alarm firing, a notification of the alarm is sent to the scaling service frontend 214. The scaling service frontend 214 passes this information to the scaling service backend 228, which then fetches the corresponding scaling policy from the database service 220. The scaling service backend 228 examines the parameters in the retrieved scaling policy, obtains the current capacity of the resource to be scaled from the appropriate resource service, and performs the calculations specified by the scaling policy in view of the current capacity to determine the new desired capacity for the resource needs to be scaled. Note that for some policy types, like a step policy, the scaling service 202 will get information about the metric in order to determine which steps in the scaling policy to apply to the resource. For example, the customer 226 may create a scaling policy for scaling up and down a resource based on a metric that is an indication of application load or traffic volume by setting up an alarm to trigger at certain thresholds of application load or traffic volume and attaching a policy to it. In this example, triggering the alarm will invoke the policy so that when traffic volume goes up and down, the resource will be scaled as dictated by the scaling policy.

In some embodiments, the telemetry service 206 sends alarms in response to the occurrence of certain specified events. Examples of such events include sending a message via a message queuing service or executing certain functions in a software container. Additionally or alternatively, in some embodiments, scaling policies can be triggered according to a predefined schedule. For example, the customer 226 may set a scaling schedule that triggers a scaling policy at 6:00 PM every day. Interruption of the telemetry service 206 may result in delayed scaling due to the delay in a telemetry service alarm being sent to the scaling service 202 to trigger execution of a scaling policy. Although metric-based alarms may be impacted due to unavailability of the telemetry service 206, on-demand (e.g., the customer 226 via the scaling service frontend 214) and scheduled scaling (e.g., command sent to the scaling service frontend 214 according to a schedule) would not be affected.

Upon receiving a call from telemetry service 206 to invoke a scaling policy, the scaling service backend 228 may synchronously calculate the new desired capacity for the scalable target and the scaling service workflow manager 224 may asynchronously set the desired capacity for the scalable target. The scaling service workflow manager 224 may contain workflow and activity definitions use when effecting and monitoring changes to the target service. Workflows may be launched by the scaling service workflow manager 224, which may utilize a control plane service to record, in the database service 220, interactions with the target service. Besides setting desired capacity, the scaling service workflow manager 224 may also record scaling activities. In some embodiments, the scaling service workflow manager 224 can also send notifications and/or publish events. The scaling service backend 228 may be responsible for starting workflow executions (e.g., via the workflow service 222). In some embodiments, a message queuing service is located between the scaling service backend 228 and the workflow service 222 for queuing workflow commands.

The database service 220 may be used to track the state of scaling activities, to store identities of scalable targets registered by the customer 226, and to store scaling policies defined by the customer 226. The scaling policies may be stored with the database service 220 in any applicable format, such as in a JavaScript Object Notation format in a table with the database service 220. However, the scaling policy may be automatically generated by the scaling service 202, so that the customer 226 need not directly provide the scaling policy. If the database service 220 has an outage, various methods may be performed to minimize adverse impact to the scaling service 202. For example, scalable targets and scaling policies may be cached; in this manner, new entities may not be created but the scaling service 202 will continue to automatically scale existing scalable targets. As another example, recording of the scaling history may be made as a best effort; in other words, accuracy of the scaling history may be traded for availability, and "dangling" scaling activities may be closed. As still another example, the process of writing scaling tasks to the database service 220 may be bypassed; for example, the scaling service backend 228 may put, in a queue of a message queuing service, a message for a scaling task that includes all of the data that the workflow service 222 needs in the message.

The resource services 204 may be services provided by a computing resource service provider hosting resources with scalable dimensions. An example of a resource service is a software container service. If a resource service has a problem, scaling may be impacted as the scaling service 202 may be unable to get the current capacity of or update the resources of the resource service. In some embodiments, the resource service is able to continue accepting and queuing scaling requests even if the resource service is offline, although processing such requests may be impacted.

The customer 226 may execute a scaling policy in a variety of ways. For example, in some embodiments, the customer 226 can execute the policy using a command line interface, a software development kit, or a console interface (e.g., accessible via a browser). As another example, in some embodiments, the customer 226 can have the policy invoked in response to receiving an alarm from the telemetry service 206. As still another example, the customer 226 can have the policy invoked by the occurrence of an event detected by the telemetry service 206. In yet another example, the customer 226 can have the policy invoked according to a schedule specified to the telemetry service 206 by the customer 226.

Each scaling action (e.g., each change made to a service construct's desired task count, etc.) may have associated metadata, such as a unique activity identifier (ID), resource URN, description, cause, start time, end time, and/or status. This associated metadata may be recorded/logged with the database service 220 in conjunction with each scaling action performed by the scaling service 202. The customer 226 may subsequently query the scaling activities of a particular resource service (e.g., a software container service) by its URN. An example of the metadata is shown below:

ActivityId: ac813dee-e1e0-4804-8baf-5f3684e200cd
ResourceURN: urn:ws:containerservice:us-east-1: 123456789012:service/my-containerservice-service
Description: Increasing desired task count
Cause: At 2015-10-06T17:43:07Z the desired task count was changed from 1 to 2 in response to alarm my-containerservice-scale-up-alarm.
StartTime: 2015-10-06T17:43:10.414Z
EndTime: 2015-10-06T17:44:13.364Z
StatusCode: Successful Scaling actions may cause a telemetry service event to be published. This notification may look like the following:
Service: software container service
Time: 2015-10-06T17:44:13.364Z
Event: containerservice:SERVICE DESIRED COUNT INCREASE
AccountId: 123456789012
ResourceURN: urn:ws:containerservice:us-east-1: 123456789012:service/my-containerservice-service
ActivityId: ac813dee-e1e0-4804-8baf-5f3684e200cd
Description: Increasing desired task count
Cause: At 2015-10-06T17:43:07Z the desired task count was changed from 1 to 2 in response to alarm my-containerservice-scale-up-alarm.
StartTime: 2015-10-06T17:43:10.414Z
EndTime: 2015-10-06T17:44:13.364Z
StatusCode: Successful After each change to the scalable dimension (e.g., the desired task count of the service construct), the system may check the current alarm state to see if additional scaling is required.

The precise behavior is as follows:
If scaling policy is an action for OK state (i.e., maintain current state), no action is taken.
If scaling policy is an action for ALARM or INSUFFI-CIENT_DATA state:
  Get the alarm's current state.
  If the alarm's current state matches the configured policy:
    If timeout has expired, reset alarm state to OK (this ensures that if the state goes into ALARM or INSUFFICIENT_DATA again, the telemetry service 206 may call the scaling service 202 to execute the policy again.
    If timeout has not expired:
      If current time is after cooldown expiration time, call InvokeAlarmAction( ) to execute the policy again.

Otherwise, wait an amount of time (e.g., one minute) and repeat the process step, starting from getting alarm state (e.g., an alarm is evaluated every minute).

For a software container service, at least two types of events may cause notifications to be sent: an increase in desired task count and a decrease in desired task count. The customer 226 may choose to have notifications sent (e.g., via a notification service) for one or both types of events. Further, for software container service, if a scaling policy is triggered by an alarm of the telemetry service 206, the desired task count of the service construct may be changed continuously, based on the current running count and a scaling adjustment specified (within the minimum and maximum capacity) in the scaling policy until the alarm has been cleared, the minimum/maximum capacity has been reached, or the timeout has expired. The timeout may be primarily for the case where a cluster of instances does not have enough capacity for running new tasks, but the alarm that has triggered the policy is still in effect.

If the scaling policy is triggered manually by the customer 226, by the occurrence of an event, or according to a schedule, rather than by an alarm of the telemetry service 206, the desired task count of the service construct may be changed based on the current running count and the scaling adjustment specified in the policy, within the minimum and maximum capacity.

The scaling service 202 may apply the scaling adjustment specified in the policy to the current running count of the service construct. Some examples:

If the current running count is 20, and the scaling adjustment is a percentage delta of 5%, then the new desired task count will be 20+20*5%=21.

If the current running count is 20, and the scaling adjustment is an absolute delta of 2 tasks, then the new desired task count will be 20+2=22.

If the current running count is 20, and the scaling adjustment is an exact capacity of 25 tasks, then the new desired task count will be 25.

The running count may be the actual processing capacity, as opposed to the desired task count, which is what the processing capacity is supposed to be. Calculating the new desired task count from the running count may prevent excessive scaling. For example, if the scaling service 202 has increased the desired task count by 1, the alarm that triggered the scaling policy may still be active during the time that the task is being launched. However, once the new task is fully launched, the alarm may be deactivated, ensuring that the scaling service 202 does not scale-out further.

In some embodiments, scale-out is prioritized over scale-in; i.e., a scale-out will override an in-progress scale-in, but not vice versa. In other embodiments, the reverse is true. An in-progress scale-in may be indicated by the running count being greater than the desired task count. In this situation, the scaling service 202 may allow a scale-out to increase the desired task count in a manner that optimally maintains application availability. Conversely, an in-progress scale-out may be indicated by the running count being less than the desired task count, in which case the scaling service 202 may not allow a scale-in to decrease the desired task count in order to optimally protect application availability.

The customer 226 may use a set of general purpose automatic scaling API operations (names in parentheses below are parameter names):

RegisterScalableResource(ResourceURN, Context, MaxCapacity, MinCapacity, RoleURN)
DescribeScalableResources(ResourceURNs, Context)
DeregisterScalableResource(ResourceURN, Context)
PutScalingPolicy(PolicyName, ResourceURN, Context, PolicyType, SimpleScalingPolicyConfiguration, Step ScalingPolicyConfiguration, TargetUtilizationScalingPolicyConfiguration)
DescribeScalingPolicies(PolicyNamesOrURNs, ResourceURN, Context)
DeleteScalingPolicy(PolicyNameOrURN, ResourceURN, Context)
ExecuteScalingPolicy(PolicyNameOrURN, ResourceURN, Context)
DescribeScalingActivities(ActivityIds, ResourceURN, Context)

Regarding the parameters of the API operations: ResourceURN refers to the URN of the resource to be scaled. For software container service automatic scaling, ResourceURN may be the URN of the software container service. Context refers to a string representation of a JSON object that allows resource-specific parameters to be specified. For software container service automatic scaling, customers may specify a cluster (if omitted, the default cluster is assumed):

```
{
  "cluster": "string"
}
```

The combination of ResourceURN and Context may uniquely identify a scalable resource. Supported policy types for scaling may include "SimpleScaling," "StepScaling," and "TargetUtilizationScaling." Each policy type has its own configuration parameters. For "Simple Scaling," the policy configuration may have the following parameters:

AdjustmentType: "PercentChangeInCapacity," "ChangeInCapacity" or "ExactCapacity"; for software container service automatic scaling, "capacity" refers to the number of tasks on a cluster.

ScalingAdjustment: a number whose meaning depends on adjustment type; e.g., if scaling adjustment is 10 and adjustment type is percentage change in capacity, then the adjustment is plus 10 percent of actual capacity.

MinAdjustmentMagnitude: may only be applicable when AdjustmentType is "PercentChangeInCapacity," to protect against an event where the specified percentage of the current capacity results in a very small number.

Cooldown: allows the customer 226 to specify an amount of time to pass before allowing additional scaling actions; it starts once a scaling action has been completed, and no further scaling actions are allowed until after it has expired.

The scaling service 202 may also utilize a timeout. The timeout may serve at least two purposes. First, the scaling service 202 may utilize a timeout in a check alarm state workflow in an event that a scaling action becomes stuck for an excessive (i.e., greater than a defined threshold) period of time; for example, a service construct cluster that does not have enough capacity for new tasks may not respond to a demand to increase the number of tasks. In such an event, the alarm could remain in breach for a long time, and the timeout prevents the scaling service 202 from continually checking its state. Second, the scaling service 202 may prioritize scale-out/scale-up over scale-in/scale-down, but the scaling service 202 should not let a stuck scale-out/scale-up (e.g., due to an InsufficientCapacityException) prevent a scale-in/scale-down from occurring. Thus, a timeout may allow the scaling service 202 to unblock the scale-in. Note that in some implementations, the timeout is user configurable, whereas in other implementations the timeout is a user non-configurable value which the scaling service 202 uses to determine whether to give up on a stuck scale-out.

The scaling service 202 is designed as a layer on top of the resource services 204 that calls into those services on behalf of the customer 226. This ensures that the scaling service 202 provides the customer 226 with a consistent automatic scaling experience for all resource services. The customer 226 may first create an alarm, or the customer may choose an existing alarm, in a console of the telemetry service 206, and then apply a scaling policy to the alarm.

Under certain conditions, scaling for a particular resource may be temporarily suspended. For example, during a software deployment by the customer 226 to a software container service, actual capacity may exceed the desired capacity, which could inadvertently trigger a scale-in activity. In such an event, scaling may be suspended for the software container service for the customer 226 until deployment is complete. In order to stop scaling of a resource managed by the scaling service 202, the customer 226 may simply deregister the resource dimension as a scalable target.

If the customer 226 subscribes to a software container service as one of the resource services 204, and then the customer 226 wants to set up autoscaling for the software container service, then the customer 226 may first register the resource IDs of the customer's software container service software containers with the scaling service 202. Then the customer 226 may create one or more scaling policies for the software container service resources corresponding to the resource IDs. In the course of a scaling policy, the customer 226 may define scaling parameters that instruct the scaling service 202 how to scale-up or down the resource if the scaling policy is invoked.

One scaling policy type is a "step" policy, which allows the customer 226 to define multiple steps of scaling adjustments with respect to the measurement that triggers execution of the scaling policy. For example, the customer 226 may specify to scale-up a scalable dimension of the resource if processor utilization reaches certain threshold steps. For example, the customer 226 may specify to scale-up the scalable dimension of the resource by 10 percent if processor utilization is between 50 and 60 percent. The customer may further specify to scale-up the scalable dimension by 20 percent, if processor utilization is between 60 and 70 percent, scale-up the scalable dimension by 30 percent if processor utilization is above 70 percent, and so on. In this manner the customer 226 can define multiple steps and/or multiple responses with different magnitudes with respect to the specified metrics.

The API of the scaling service 202 may be designed to operate as a separate service from the resource services 204 such that it is not integrated into any particular service of the resource services 204. In this manner, the scaling service 202 is not dependent upon any particular service of the resource services 204. In order to set up a particular resource service to be scaled by the scaling service 202, the scaling service 202 simply needs information about the APIs of the particular resource service to call in order to direct the particular resource service to scale-up or down. The scaling service 202 is able to maintain this independence by specifying which dimension of which resource of the particular resource service to scale and whether to scale-up or down; the logistics of how the particular resource should be scaled (e.g., which tasks to terminate, which container instances that do tasks should be launched, etc.) in response to direction from the scaling service 202 is determined by the particular resource service itself In some embodiments, additional components not pictured in FIG. 2 may be present within the scaling service 202. For example, in certain embodiments, a control plane service is present between the scaling service workflow manager 224 and external services such as the authentication service 216 and the database service 220. For example, the control plane service may provide API operations for updating scaling history. Furthermore, having certain functions performed by the control plane instead of the scaling service backend 228 may mitigate performance impact if the scaling service backend 228 receives requests for many data retrieval operations from the customer 226. With a separate control plane, the effect on the scaling service 202 of the increased volume of retrieval operations is minimized. The control plane service may exist in addition to the backend service and may track and record all persistent service (e.g., database service 220, authentication service 216, etc.) interactions. In other embodiments, however, control plane functionality is integrated into the scaling service backend 228.

Also in some embodiments, service adapters are present within the scaling service 202 between the resource services 204 and certain scaling service components, such as the scaling service backend 228 and the scaling service workflow manager 224. The service adapters may be responsible for routing the scaling request through appropriate APIs for the target service. In alternative embodiments, the service adapter functionality is present within the scaling service workflow manager 224 and/or the scaling service backend 228. However, because the scaling service 202 is decoupled from the resource services 204, the scaling service 202 relies on a response from the particular resource service in order to determine whether a scaling request has been fulfilled.

The workflow service 222 may be a collection of computing devices and other resources collectively configured to perform task coordination and management services that enable executing computing tasks across a plurality of computing environments and platforms. The workflow service 222 may provide a workflow engine used to effect asynchronous changes in the scaling service 202. The workflow service 222 may be used to update target resources and may also be used as a lock to control concurrent scaling requests. The workflow service 222 may track the progress of workflow execution and perform the dispatching and holding of tasks. Further, the workflow service 222 may control the assignment of hosts or physical or virtual computing machines used for executing the tasks. For example, a user may define a workflow for execution such that the workflow includes one or more tasks using an API function call to the workflow service 222. Further, the user may specify task order for the workflow, conditional flows, and timeout periods for restarting or terminating the execution of the workflow. In addition, execution loops for the workflow may be defined. Workflow execution may be asynchronous and may be preceded by synchronous execution of database writes.

Interruption of the workflow service 222 may cause delayed scaling, as the asynchronous processing of scaling requests may be adversely impacted. One way to mitigate delayed scaling may be only to do what is absolutely required to scale synchronously via the scaling service frontend 214. At a minimum, the scaling service may attempt to set desired capacity and record scaling history. From a performance standpoint, this should be acceptable as it just requires an API call to the resource service owning the resource to be scaled and a couple of extra writes to the database service 220. Although this may result in losing features of workflow service 222 (e.g., retry mechanism, history tracking, etc.), but at least the system will perform the operations that are required to scale.

The scalable targets (i.e., scalable resources) may reside with the resource services 204. A scalable target may be uniquely identified from the triple combination of service (e.g., service namespace), resource (e.g., resource ID), and scalable dimension. The resource services 204 represent the services that actually manage the resources that the customer 226 wants to be automatically scaled. In this manner, the scaling service 202 exists as a separate service from the resource services 204 whose resources are caused to be scaled by the scaling service 202. The resource services 204, as noted, may include services such as a software container service, a database service, a streaming service, and so on. The scaling service 202 may take the scaling policies created by the customer 226, and, when the scaling policies are invoked (e.g., by an alarm from the telemetry service 206), the scaling service 202 may perform the calculations to determine, given the particular policy and the current capacity of the resource, whether to increase or decrease the capacity to a new value. In order to get the current capacity of the resource, the scaling service backend 228 may make a service call to the resource service 204 of the resource to be scaled. In response, the resource service 204 may provide the scaling service 202 with the current capacity (e.g., "five tasks").

The scaling service workflow manager 224 may then make a service call to the resource service 204 that actually owns the resource to be scaled, (e.g., a software container service), to cause the scaling action to be performed. For example, the scaling service workflow manager 224 may make a request to a service construct to increase the number of tasks from five to ten. In response, the software container service may trigger an asynchronous workflow to fulfill this request, and the scaling service 202 may determine the completion of this request by periodically polling the service construct for the current capacity until the current capacity reaches ten or the timeout event occurs (in which case, the scaling service 202 may interpret to be a scaling event failure). In other words, because the scaling service 202 is a separate service from the resource service 204 that host the resources, the scaling service 202 will make service calls to the resource service that owns the resource in order to get the state of the resource and also to change the state of the resource.

The authentication service 216 may be a service used for authenticating users and other entities (e.g., other services). For example, when a customer of a computing resource service provider interacts with an API of the computing resource service provider, the computing resource service provider queries the authentication service 216 to determine whether the customer is authorized to have the API request fulfilled. In the process of creating a scaling policy, the customer 226 may assign the scaling service 202 to a role that authorizes fulfillment of certain requests, and the scaling service 202 may then assume that role in order to make appropriate requests to cause a resource service associated with the policy to scale resources. For example, for a software container service, authorization to perform two software container service APIs, DescribeServices( ) and UpdateService( ) may be needed. DescribeServices( ) may be used to get the current capacity, and UpdateService( ) may be used to set the new capacity. In this example, the customer 226 gives, to the scaling service 202, a role management service role that gives permission to call those software container service APIs. Then, the scaling service 202 may assume the role management service role when it makes calls to the software container service. In this manner, the role management service role gives the scaling service 202 the necessary permission to access the resource that lives in the resource services 204.

The customer 226 may create a role management service role through an interface console. The interface console may allow the customer 226 to click an appropriate button or consent checkbox in the interface console, and the underlying system may create the role with the necessary permissions. The token service 218 may provide the scaling service 202 with session credentials based on a role or roles specified by the customer 226. These session credentials may be used by the scaling service 202 to interact with the resource services 204 on behalf of the customer 226. The token service 218 may provide a token to the scaling service 202 that the scaling service may include with requests that provide evidence that the scaling service 202 has been granted the appropriate role to cause scalable dimensions of a resource in the resource services 204 to be manipulated. The role may be utilized by the automatic scaling service to call a resource service's APIs on behalf of the customer 226.

Interruption of the token service 218 may result in the scaling service 202 being unable to assume a role management service role, and the scaling service 202 thereby being unable to scale a resource of the customer 226. In some embodiments, the scaling service 202 caches temporary credentials (e.g., they may be valid for 15 minutes, etc.) that the scaling service 202 can use when assuming a role.

As described in the present disclosure, the scaling service 202, itself, does not determine whether conditions that trigger a scaling policy are met. Rather, an external entity, such as the telemetry service 206, determines whether conditions have been met (e.g., by an alarm specified by the customer 226), and, if met, send a notification to the scaling service 202 that triggers execution of the appropriate scaling policy. Thus, a scaling policy may be triggered by an alarm sent by this telemetry service 206, by the occurrence of an event that triggers notification from an external entity, on demand by the customer 226, according to a notification that is sent to the scaling service 202 according to a schedule, or by some other external notification.

As noted, in some embodiments, the scaling service supports application scaling. In some examples, "application scaling" may refer to a grouped set of resources from different services (e.g., comprising an application of the customer, such as a virtual machine from a virtual computer system service and a database from a database service). Through the scaling service interface, the customer 226 may group different resources together under a common name for scaling. For example, if the customer 226 has resources that use a database service, virtual computing system service, load balancing service, and a streaming service, the customer 226 may use a group scaling policy to scale-up or scale-down scalable dimensions of the resource of the group based on a particular trigger (e.g., alarm of the telemetry service 206). Based at least in part on the policy, the scaling service 202 knows which scaling commands to send to which service. In this manner, the customer can group together some or all of the customer's services/resources and perform scaling for that group of services as opposed to scaling resources individually. For example, a scaling policy triggered by a telemetry service alarm may specify to increase the group by 3 more database service instances, 10 more virtual machines, and 4 load balancers.

Additionally or alternatively, in some embodiments, the scaling service 202 supports "target tracking metrics." In some examples, "target tracking metrics" refer to measurements that the customer 226 wants to keep within a specific range. This simplifies the user experience, because the customer 226 simply specifies the metric of a resource and the particular range, and the scaling service 202 determines how to scale the resource to keep the measurements within the particular range. For example, if the scalable dimension is processor utilization, and the customer specifies to keep the scalable dimension between 40 and 60 percent, the scaling service 202 determines how to keep the measurements within this range. Consequently, the customer is spared having to define, for example, within a first range to scale-up by a first amount, within a second range to scale-up by a second amount, and so on.

Scaling resources of a software container service provides, among other benefits, the ability to scale tasks and/or grow and shrink container capacity in response to application load, execution time, or to balance service performance or costs. The scaling service 202 provides the ability to autoscale containers based on measurements aggregated by the telemetry service 206. Scaling policies of the scaling service 202 may allow additional containers to be launched, and may allow a number of currently running containers to be stopped or terminated.

Functionality of the scaling service 202 may be integrated with a console of the software container service, which may show the scaling actions available and may allow the customer 226 to create, update, and delete scaling actions for each service construct. The customer 226 may use any metric available to the telemetry service 206 for setting an alarm to trigger the scaling policies. In some embodiments of the telemetry service 206, the customer 226 can create custom metrics emitted by the customer's application to the telemetry service 206 (e.g., message queuing service queue depth, load balancing service surge queue length, etc.), which may also be used to trigger alarms for invoking scaling service policies.

The customer 226 can configure automatic task scaling with the scaling service 202 by first creating or updating a service construct and specifying a minimum and maximum number of tasks for the service construct the customer 226 may then create scaling policies. As noted, a scaling policy may be triggered by an alarm of the telemetry service 206, and in response, the scaling service may perform a scaling action (e.g., scale-up 10 tasks) specified by the scaling policy. The software container service console may aid the customer 226 in creating the alarm with the telemetry service 206. The customer 226 may create a role for the scaling service that authorizes the scaling service to have its scaling actions fulfilled, and this role may be specified in the scaling policy. The software container service console may then allow the customer 226 to create the scaling policies and the scaling actions with the scaling service 202 by calling appropriate APIs of the scaling service 202. Subsequently, as a result of the configured alarm of the telemetry service 206 firing, the scaling service 202 may perform the specified scaling actions.

As noted, automatic task scaling may be performed through a software container service CLI or software container service console. In addition, the scaling service 202 may have its own APIs that may be accessed through its own CLI or console. In some embodiments, the scaling service creates a history of scaling actions for each service construct. Additionally or alternatively, in other embodiments, the software container service includes a startedBy (or changedBy) attribute to its update-service API, which may be in a service scheduler event stream.

Figure 3:
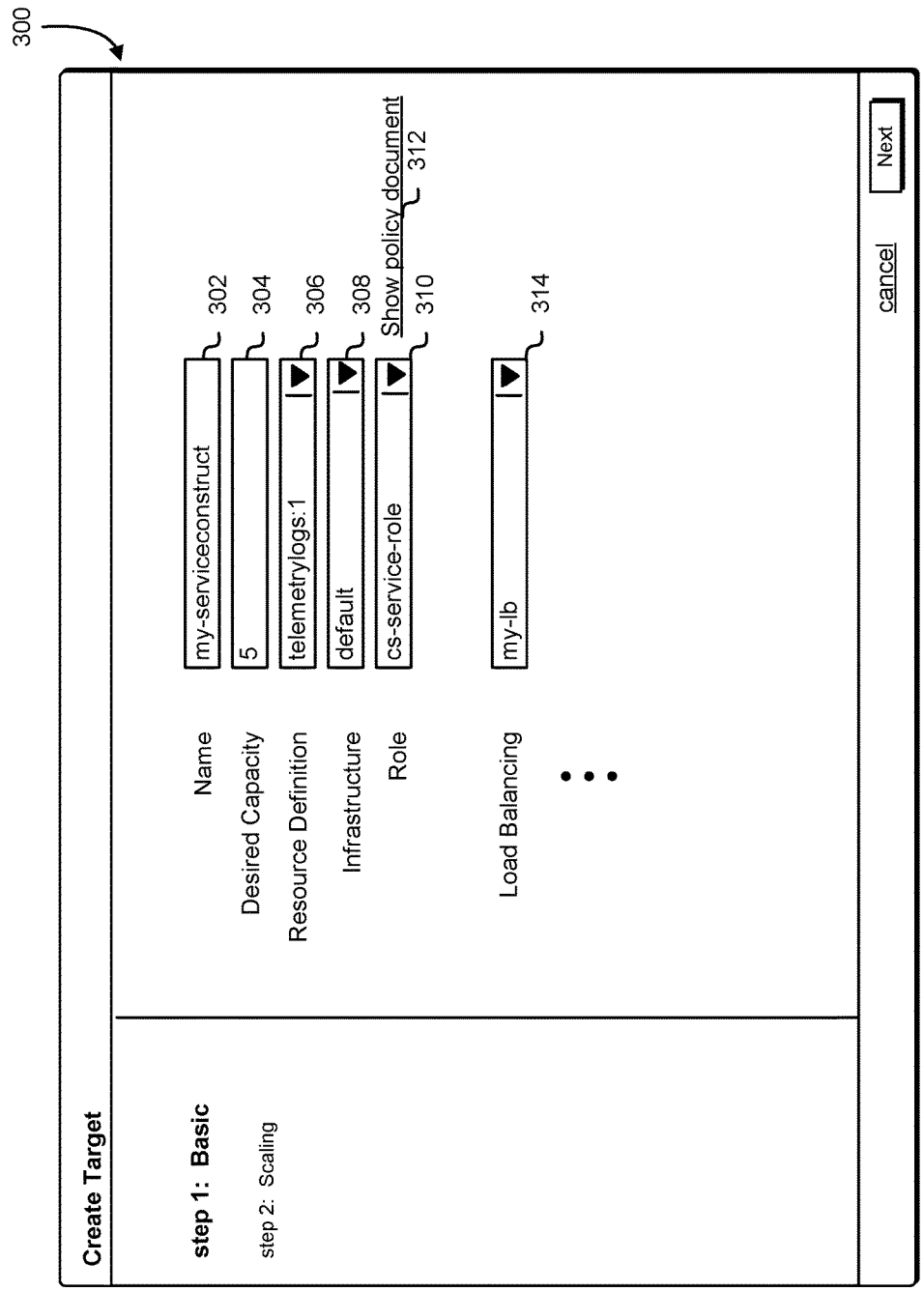
FIG. 3 illustrates an example of a first screen of a console for scaling a software container service resource in accordance with an embodiment.

FIG. 3 illustrates an example interface console 300 of an embodiment of the present disclosure. As illustrated in FIG. 3, the example interface console 300 may include a plurality of controls for configuring a scaling policy. The controls depicted in FIG. 3 include a name field 302 for specifying a name of a resource (e.g., service construct) to scale, a desired capacity field 304 for specifying a desired capacity (e.g., task count) for the resource, a resource (e.g., task) definition field 306 for specifying a name of a resource definition file for the resource, an infrastructure field 308 for specifying an identity of an infrastructure (e.g., a cluster) for the resource, a role field 310 for specifying a role that the scaling service is to assume making scaling requests, a link 312 to the policy document of the role, and a load-balancing field 314 for specifying a load balancer to associate with the scaling policy. The example interface console 300 is depicted for illustrative purposes only, and it should be understood that the number and type of fields may vary based on implementation.

Figure 4:
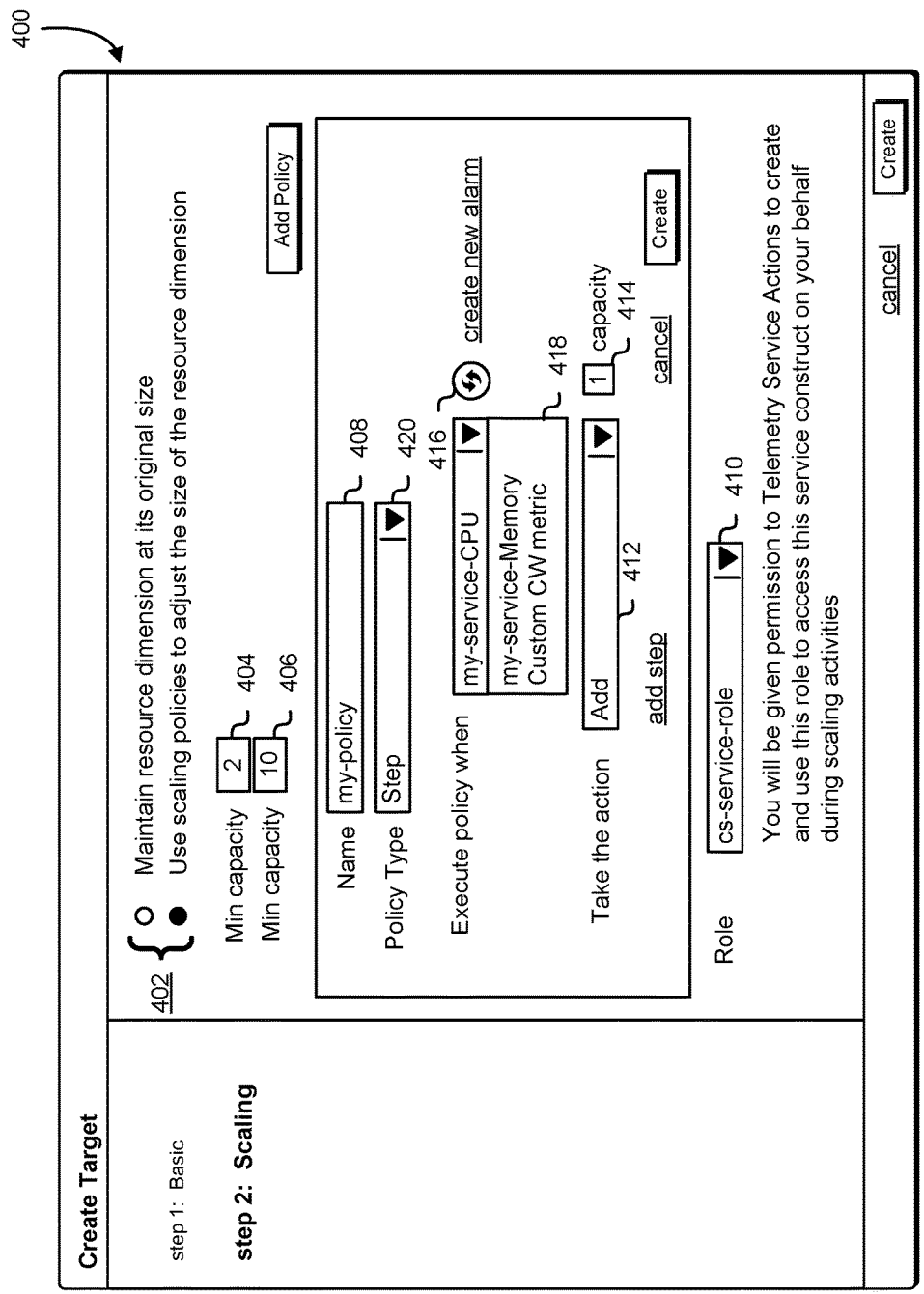
FIG. 4 illustrates an example of a second screen of the console for scaling the software container service resource in accordance with an embodiment.

FIG. 4 illustrates another example interface 400 of an embodiment of the present disclosure. As illustrated in FIG. 4, the example interface 400 may include a plurality of controls for further configuring the scaling policy. The controls depicted in FIG. 4 include radio buttons 402 for specifying whether the resource dimension should remain at the original size or to use scaling policies to adjust the size of the service resource dimension, a minimum capacity field 404 for specifying the minimum capacity (e.g., number of tasks) that should the scalable dimension should be, a maximum capacity field 406 for specifying the maximum capacity that the scalable dimension should be, a name field 408 for specifying a name that should be assigned to the scaling policy, a policy type field 424 specifying the type of policy (e.g., simple, step, target utilization, etc.) an alarm fields 410 for specifying the name of an alarm metric configured with a telemetry service, a create new alarm button 416 for creating a new alarm at the telemetry service, a scaling actions field 412 for specifying the scaling action (e.g., scale-up, scale-down, scale-in, scale-out, etc.), and a capacity (e.g., number of tasks) field 414 for specifying an amount for a scalable dimension (e.g., "tasks") to be scaled according to the action specified in the scaling action field 412.

Figure 5:
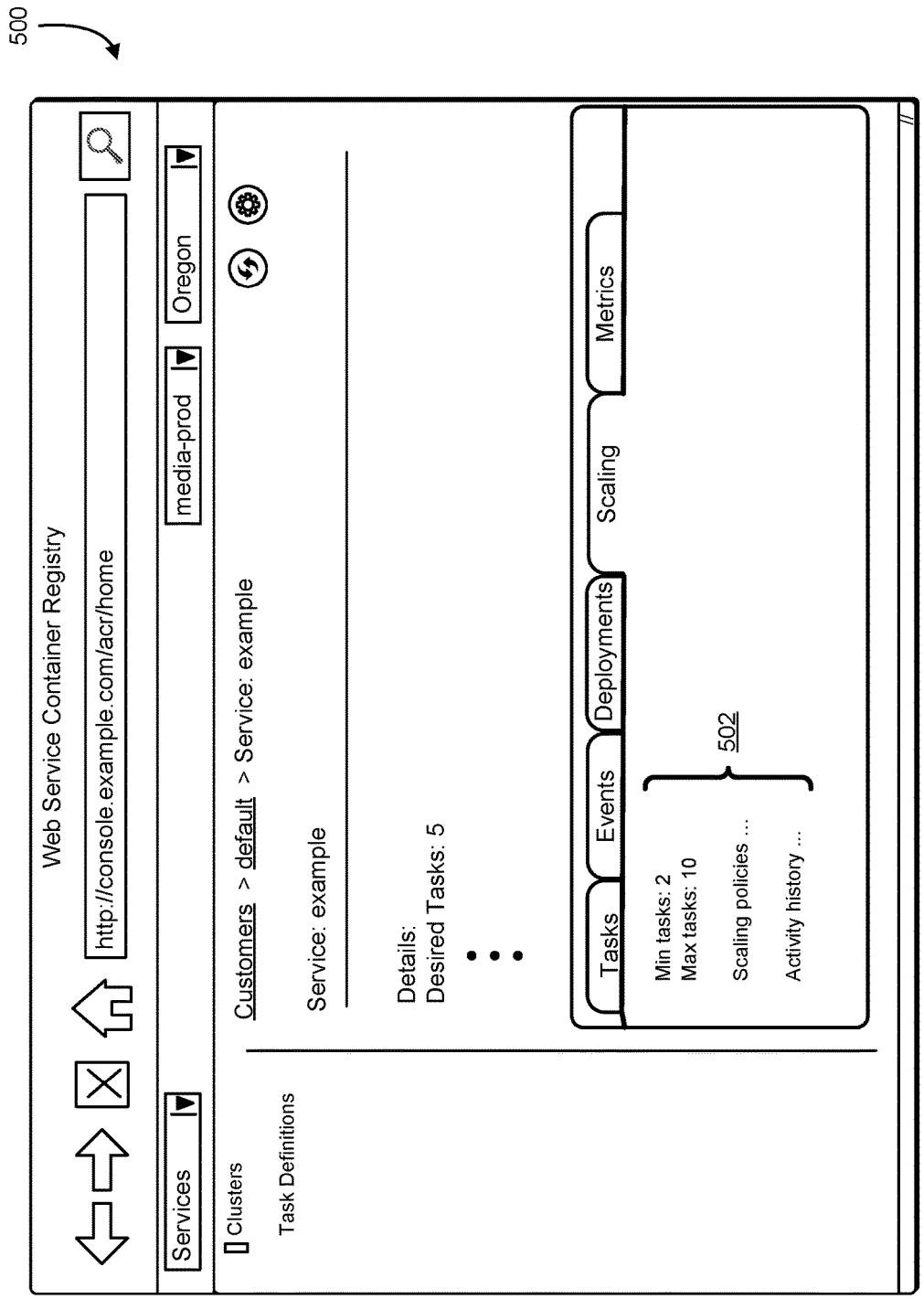
FIG. 5 illustrates an example of a user interface console in accordance with an embodiment.

FIG. 5 illustrates an example console 500 of an embodiment of the present disclosure. As illustrated in FIG. 5, the example console 500 may include details 502 about a scaling policy assigned to a particular resource service. Specifically, FIG. 5 depicts a scaling policy assigned to a service construct ("example") of a software container service, such as the software container service 804 of FIG. 8. The details 502 include the minimum capacity (e.g., number of tasks), maximum capacity, and names of the scaling policies assigned to the scalable resource (e.g., service construct) as may be set in the example interface consoles 300 and 400 of FIGS. 3 and 4 respectively. The details 502 may further include a history of scaling actions performed against the scalable resource; that is, changes to the capacity of the resource (e.g., increase or decrease) and/or whether a scaling action was successful or not, may be logged and displayed as activity history in the details 502.

A cluster may be comprised of a group of instances that a customer, such as the customer 226 of FIG. 2, can launch for placing tasks, and it should be noted that multiple service constructs could run within the cluster. Thus, groups of instances will be treated as clusters. As noted, tasks may be processes being executed within a group of containers on virtual machine instances. Thus, the customer may use the software container service startTask( ) or runTask( ) APIs to launch tasks just like launching virtual machines. If, for some reason, a task freezes or crashes (i.e., "dies"), in some embodiments there may not be a monitoring system in place to detect the problem and re-launch the "dead" task. However, the customer may create a meta-construct, called a service construct inside the cluster, and utilize the service construct to fulfill this responsibility; i.e., specifying that the service construct should keep a certain number of particular tasks running on each instance in the cluster. For example, the customer can define that the service construct is backed by ten copies of the same task, link the service construct to a load balancer, and specify that, if a task dies then a service scheduler is to replace that task with a new one. In this example, the goal of the service construct is to make sure that all ten tasks are running. However, the scaling service may provide added flexibility to the software container service by allowing the customer to specify that, if there is too much load on this particular service construct (e.g., if there is a load spike, etc.), the scaling service should cause the service construct to instead run 20 or 50 tasks instead of 10.

The customer can specify that if a particular task metric (e.g., processor usage, number of requests coming to a task, etc.) increases above a threshold, the customer can configure the software container service to push the particular task metrics to a telemetry service, such as the telemetry service 206. The customer can specify with the telemetry service that if the metric measurement exceeds the threshold, to trigger a scaling policy, which may then make an API call to the service construct to scale-up the cluster, launch a new container instance into this cluster, scale-up the service construct, and so on. The scaling policy may be configured to perform multiple scaling actions.

The scheduler of the software container service may have a parameter called "desired count," the value of which indicates how many tasks should be running in a service construct of a particular cluster. The scheduler may be responsible for ensuring that the number of tasks running matches the desired count. For example, if the desired count is 50, and the 50 running tasks crash, the scheduler may launch 50 more tasks to achieve the desired count. Likewise, if there are 200 tasks running in a cluster and the desired count is 100, the scheduler may shut down 100 of the tasks to achieve the desired count. Thus, the scaling service may scale the tasks of the customer by making an API request to change, according to the scaling policy, the desired count of tasks in the service construct of the cluster.

In response to receiving a request from the scaling service to change the desired count of the service construct, the service construct will attempt to launch new tasks so that the number of running tasks matches the new desired count. In some embodiments, the service construct supports launching new container instances, such as if there is not enough capacity to launch new tasks in the currently running container instances, in order to fulfill the desired count, or in response to a command from the scaling service to launch new container instances.

In some implementation of a software container service, a service construct can be attached to a load balancer. In such implementations, the load balancer itself generates measurements, which can be provided to the telemetry service. Consequently, telemetry alarms can be configured to be triggered based on these measurements and can thereby cause the scaling service to execute a scaling policy (e.g., to launch more tasks, to shut down running tasks, etc.).

Figure 6:
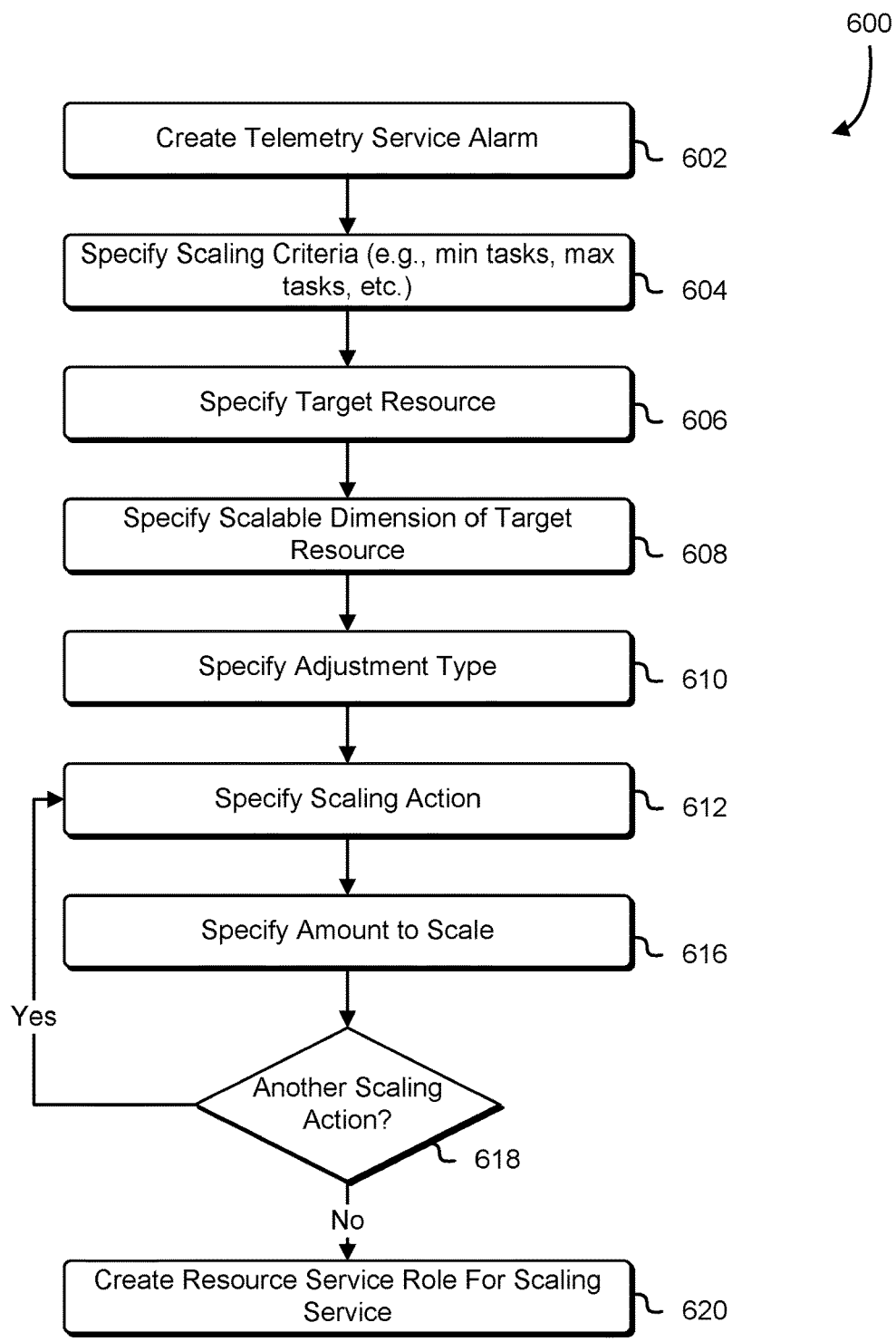
FIG. 6 is a flowchart that illustrates an example of configuring a scaling service in accordance with an embodiment.

FIG. 6 is a flowchart illustrating an example of a process 600 for configuring a scaling service to scale a scalable dimension of a resource in accordance with various embodiments. Some or all of the process 600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Figure 10:
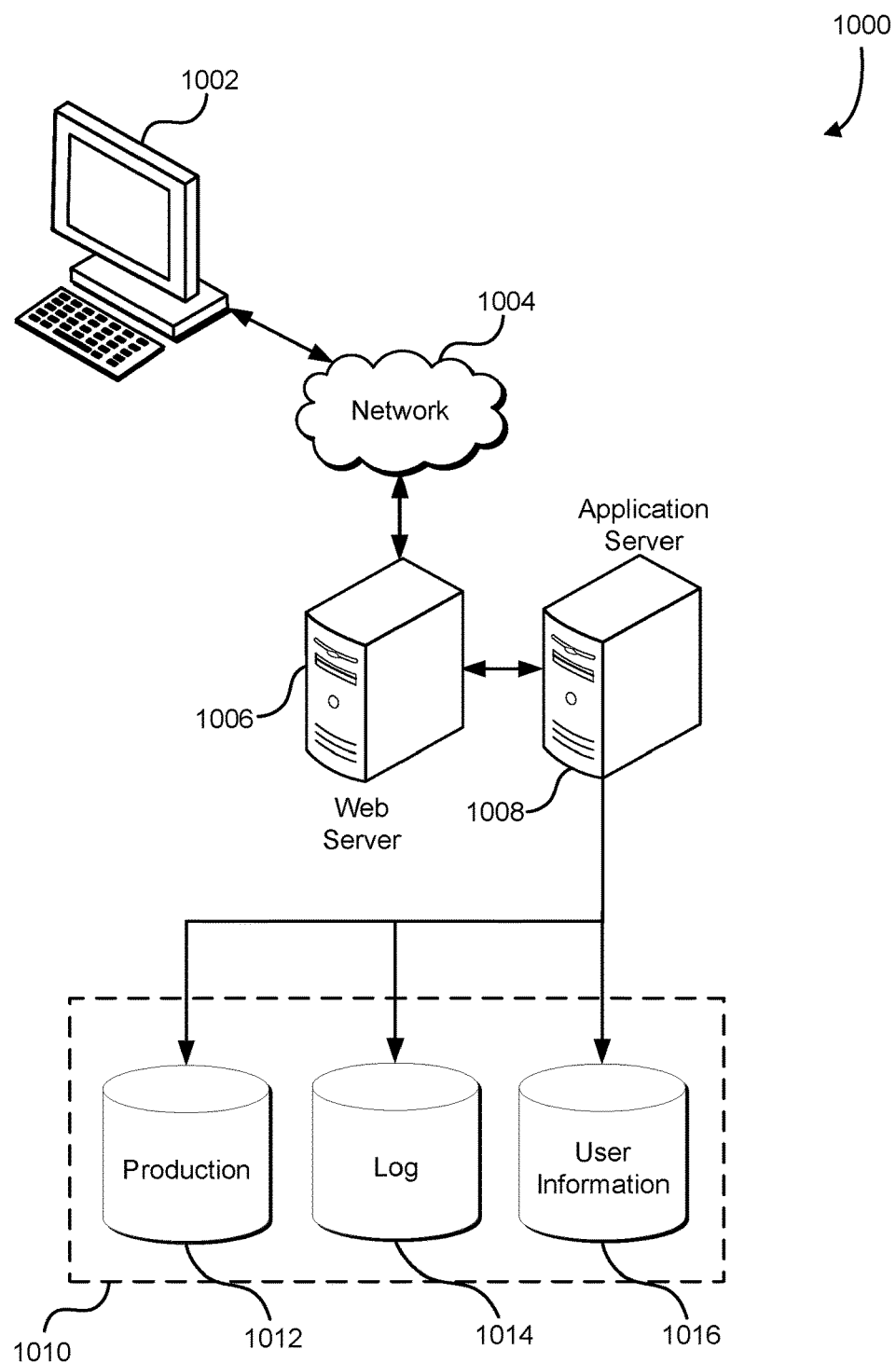
FIG. 10 illustrates an environment in which various embodiments can be implemented.

For example, some or all of process 600 may be performed by any suitable system, such as a server in a data center, by various components of the example environment 1000 described in conjunction with FIG. 10, such as the web server 1006 or the application server 1008, by multiple computing devices in a distributed system of a computing resource service provider, or by any electronic client device such as the electronic client device 1002. The process 600 includes a series of operations wherein a telemetry service alarm is created, scaling criteria specified, target resources identified, scalable dimension of the target resources identified, a scaling action to perform on the scalable dimension is specified, scaling direction for the scaling action is specified, an amount to scale is specified.

In 602, a telemetry service alarm is created by a customer-owner of the resource to be scaled. Although the process 600 using a telemetry service alarm to trigger a scaling policy, as described in the present disclosure, other signal the notifications received from external entities (e.g., according to a schedule, on demand from the customer, in response to the occurrence of an event, etc.) may be used to trigger the scaling policy. In such cases, the operations of 602 may represent the operations necessary to configure the external entity to trigger the scaling service into invoking the scaling policy.

In 604, scaling criteria (other than scaling criteria illustrated in 606-20) may be specified, such as the minimum number of tasks and maximum number of tasks, such as specified in the fields 404-06 of the example interface of FIG. 4. In 606, an identity of the target resource may be specified. As described in the present disclosure, the identity may be specified using a URN that may include a service namespace and resource ID. In 608, a scalable dimension may be specified. Scalable dimensions may vary based on the resource type. Examples of scalable dimensions include a number of tasks for a service construct of a software container service, read throughput and write throughput for table of a database service, size of a message queue of a message queuing service, and so on.

In 610, an adjustment type may be selected. Examples of adjustment types include simple scaling, step scaling, and target utilization scaling. Some adjustment types may allow multiple scaling actions to be specified. In 612, the scaling action (e.g., increase or decrease scalable dimension) to take is specified, such as shown with the drop down 412 of FIG. 4. In 616, an amount to scale is specified. The amount to scale may be an exact amount, a relative amount, a percentage, or some other amount as specified by the scaling policy. A scaling amount may be specified in an interface such as in the manner shown in the capacity field 414 of FIG. 4.

In 618, a determination is made whether to add another scaling action to the scaling policy. As noted above, in 610 some adjustment types (e.g., a step policy type) allow the customer to specify multiple scaling actions to take for a given invocation of a scaling policy. If another scaling action is to be added to the scaling policy, the system performing the process 600 may return to 612 so that another scaling action may be specified. Otherwise, if no further scaling actions are to be specified for the scaling policy the system may proceed to 620. As noted above, however, some adjustment types such as simple scaling may only allow one scaling action per policy, in which case the operations of 618 may be omitted and the system may proceed to 620. In 620, a role is created for the scaling service, such as through a policy/role management service, and specified in the scaling policy, such as in the manner shown in the role field 310 of FIG. 3. The role created grants the entity assigned to that role authorization to have specific API requests fulfilled by the resource service. In this manner, the scaling service can assume the role in making scaling requests to the resource service. Note that one or more of the operations performed in 602-20 may be performed in various orders and combinations, including in parallel.

The following is a non-exclusive list of API function calls. The API function call, RegisterScalableTarget( ), may take, for request parameters:

```
{
    "serviceNamespace": "string",
    "resourceId": "string",
    "scalableDimension": "string",
    "minCapacity": "number",
    "maxcapacity": "number",
    "roleURN": "string" // role management service role
    required to perform operations required to scale the
    resource and describe alarms triggering its scaling
    policies
}
```

The response elements for RegisterScalableTarget( ) may be:

```
{
    // None
}
```

RegisterScalableTarget( ) may be used by a customer of a computing resource service provider to register, with the scaling service, a scalable dimension of a scalable resource, hosted by the computing resource service provider. Registering the scalable target may be the initial step in enabling the scaling service to scale the resource. Any resource that can be auto-scaled by the scaling service may be referred to as a scalable target. A scalable target may be uniquely identified by the combination of three parameters: serviceNamespace, resourceId, and scalableDimension. The parameter of serviceNamespace may be used to uniquely identify the service in which the resource lives (e.g., "containerservice," "databaseservice," "streamingservice," etc.). The parameter of resourceId may be used to uniquely identify the resource within the particular serviceNamespace. Thus, each resource in a given serviceNamespace must have a unique ID to distinguish the resource from other resources in the same serviceNamespace. The parameter of scalableDimension refers to the specific dimension of the scalable resource that can be scaled. Using a database service table as an example, a customer may specify either the read capacity throughput or the write capacity throughput of the table as a scalableDimension. The customer may configure a scaling policy to scale either the read capacity throughput or the write capacity throughput independently. Thus, read capacity throughput and write capacity throughput are two different scalable dimensions of the same resource.

The parameters of minCapacity and maxCapacity may be used to allow the customer to define a range within which the scalable dimension of the resource can be scaled. The parameters of minCapacity and maxCapacity is used to prevent a situation of a scalable dimension being scaled up or down more than anticipated by the customer. That is, a resource that is scaled up too much may become more expensive then the customer anticipated, while a resource that is scaled down too much may damage the availability of the customer application that depends on the resource. The parameter of roleURN may be used by the customer to specify a policy/role management service role that grants the scaling service permission to make the API call to the resource service needed to scale the resource.

The API function call, DescribeScalableTargets( ), may take request parameters:

```
{
    "serviceNamespace": "string",
    "resourceIds": ["string"],
    "scalableDimension": "string",
    "maxResults": "number",
    "nextToken": "string"
}
```

The response elements for DescribeScalableTargets( ) may be:

```
{
    "scalableTargets": [
    {
        "serviceNamespace": "string" •
        "resourceId": "string",
        "scalableDimension": "string",
        "minCapacity": "number",
        "maxCapacity": "number",
        "roleURN": "string"
    }
    "nextToken": "string"
}
```

The API function call, DeregisterScalableTarget( ), may take request parameters:

```
{
    "serviceNamespace": "string",
    "resourceId": "string",
    "scalableDimension": "string"
}
```

The response elements for DeregisterScalableTarget( ) may be:

```
{
    // None
}
```

DescribeScalableTargets( ) may be used by the customer to obtain information about the scalable target and DeregisterScalableTarget( ) may be used by the customer to register a scalable target from the scaling service.

The API function call, PutScalingPolicy( ), may take request parameters:

```
{
    "policyName": "string", //Must be unique for given
    serviceNamespace, resourceId and scalableDimension
    "serviceNamespace": "string",
    "resourceId": "string",
    "scalableDimension": "string",
    "policyType": "string", //Values are: SimpleScaling,
    StepScaling, TargetUtilizationScaling
    "simpleScalingPolicyConfiguration": //Applicable if
    policyType is SimpleScaling
    {
        "adjustmentType": "string", // ChangeinCapacity,
        PercentChangeinCapacity or ExactCapacity
        "scalingAdjustment": "number", // Adjustment to
        capacity
        "minAdjustmentMagnitude": "number", // Applicable
        if adjustmentType is PercentChangeinCapacity
        "cooldown": "number", // In number of seconds
        "additionalParameters": // For service specific
        scaling parameters
        {
            ...
        }
    },
    "stepScalingPolicyConfiguration": //Applicable if
    policyType is StepScaling
    {
        "adjustmentType": "string", // ChangeinCapacity,
        PercentChangeinCapacity or ExactCapacity
        "stepAdjustments": [
        {
            "metricintervalLowerBound": "number",
            "metricintervalUpperBound": "number",
            "scalingAdjustment": "number"
        }
        ],
        "minAdjustmentMagnitude": "number", // Applicable
        if adjustmentType is PercentChangeinCapacity
        "cooldown": "number", // In number of seconds
        "metricAggregationType": "string", // "Average"
        (default), "Maximum", "Minimum"
        "additionalParameters": // For service specific
        scaling parameters
        {
            ...
        }
    },
    "targetUtilizationScalingPolicyconfiguration":
    //Applicable if policyType is TargetUtilizationscaling
    {
        ...
    }
}
```

The response elements for PutScalingPolicy( ) may be:

```
{
    "policyURN": "string"
}
```

Once scalable target is registered, the API PutScalingPolicy( ) may be used to set up scaling policies for the scalable targets. A scaling policy uses the parameter of policyName as well as the parameters of serviceNamespace, resourceId, and scalableDimension, which identify the scalable target. The scaling policy also has a parameter for specifying the policy type. Different policy types have different parameters. Supported policy types may include simpleScalingPolicyConfiguration, step ScalingPolicyConfiguration, and/or targetUtilizationScalingPolicyConfiguration.

The policy type of simpleScalingPolicyConfiguration may be specified to scale by a certain amount, regardless of the current measurement value with respect to the alarm threshold, as opposed to stepScalingPolicyConfiguration whereby the customer may define different scaling adjustments with respect to different ranges of the measurement. Thus, for stepScalingPolicyConfiguration, depending on the current measurement value with respect to the alarm threshold, the customer may define a different amount to scale-up or down based on the measurement value. The customer may define the parameters of adjustmentType parameter, which may include values of ChangeinCapacity, PercentChangeinCapacity, or ExactCapacity. ChangeinCapacity may be used for changing the capacity of the resource by an absolute amount. PercentChangeinCapacity may allow the customer to scale the resource by a percentage, or the customer use and adjustment type of ExactCapacity to set the scalable dimension to specific value. The parameter of stepAdjustments may correspond to the different scaling adjustments with respect to different ranges of the measurement value. For example, the customer may define a lower bound (metricintervalLowerBound) and upper bound (metricintervalUpperBound) for the metric range. Within that range, the customer may specify to apply the scalingAdjustment amount to the scalable dimension in accordance with the adjustmentType specified. In some embodiments, the customer can define multiple such ranges, each with a different scaling adjustment.

The parameter of minAdjustmentMagnitude may be used to change the capacity by percentage, if the adjustmentType of PercentChangeinCapacity was specified. The parameter of minAdjustmentMagnitude has the effect of, in a case where the scalable resource's current capacity is low, and, consequently, percentage increase is low as a result, providing a minimum change in capacity. For example, if the scalable dimension of the scalable resource has only 5 units of capacity and the percentage to scale is specified to be 10%, then a scaling action would normally only scale the resource from 5 units to 5.5 units (i.e., 10% of 5 is 0.5), which may be too small of change to make much difference. Thus, to alleviate a problem with scaling too slowly, with a minAdjustmentMagnitude of 2, the resource would instead be scaled from 5 units to 7 units. Thus, minAdjustmentMagnitude allows the customer to specify a minimum magnitude, so that if minAdjustmentMagnitude is greater than the amount to scale specified by the customer's percentage, then the scaling service may use the minAdjustmentMagnitude to cause the scalable dimension to scale-up more quickly.

The parameter of cooldown may allow the customer to define and amount of time after the scaling action is completed to take the previous scaling action into consideration. For example, if the scaling policy is invoked and the scalable dimension of the resource is scaled by one unit (e.g., from 10 to 11 for the capacity). If the scaling policy is executed a second time before expiration of the cooldown (which began at the previous invocation of the scaling policy), and, according to the policy, the capacity should now be increased by 2 units, the scaling service considers that the previous scaling action already increased capacity by 1 unit from 10 to 11. Therefore, if the scaling policy would now dictate to increase capacity by 2 units, the scaling service would subtract the previous scaling action (1 unit) having the effect of increasing capacity by 1 more unit (i.e., from 11 to 12). In some embodiments, the start time of the cooldown does not reset for scaling actions performed during the cooldown. In other embodiments, the start time of the cooldown resets to the start time of the most recent scaling action for the scaling policy, even if the scaling action occurred during a previous cooldown. In still other embodiments, the cooldown start time resets only if a scaling action performed during the cooldown resulted in a change to capacity. The purpose of this feature is that, after an initial scaling action is completed, there may be a delay before the measurement that triggered the scaling policy settles down. The cooldown period thereby allows a reasonable time for the metric to settle down. Note that, for different resources, the cooldown may need to be different, and the customer may be allowed to specify this period. After expiration of the cooldown period, if the scaling policy is again invoked to increase by 2 units, the scaling service goes ahead and increases capacity by 2 units.

The format of a policy URN format may be:

```
urn:{partition}:autoscaling:{region}:{accountid}:scalingPolicy:
{internalScalableTargetid}:resource/{serviceNamespace}/
{resourceId}:policyName/{policyName}
```

The API function call, DescribeScalingPolicies( ), may take request parameters:

```
{
    "policyNames" : ["string"],
    "serviceNamespace": "string",
    "resourceId": "string",
    "scalableDimension": "string",
    "maxResults": "number",
    "nextToken": "string"
}
```

The response elements for DescribeScalingPolicies( ) may be:

```
{
    "scalingPolicies": [
    {
        "policyURN": "string",
        "policyName": "string",
        "serviceNamespace": "string",
        "resourceId": "string",
        "scalableDimension": "string",
        "policyType": "string",
        "simpleScalingPolicyConfiguration":
        {
            "adjustmentType": "string",
            "scalingAdjustment": "number",
            "minAdjustmentMagnitude": "number",
            "cooldown": "number",
            "additionalParameters":
            {
                ...
            }
        },
        "stepScalingPolicyConfiguration":
        {
            "adjustmentType": "string",
            "stepAdjustments": [
            {
                "metricintervalLowerBound": "number",
                "metricintervalUpperBound": "number",
                "scalingAdjustment": "number"
            }
            ],
            "minAdjustmentMagnitude": "number",
            "cooldown": "number",
            "metricAggregationType": "string",
            "additionalParameters":
            {
                ...
            }
        },
```

```
        },
        "targetUtilizationScalingPolicyConfiguration":
        {
            ...
        },
        "alarms": [ // telemetry service alarms
        associated with the policy
        {
            "alarmURN": "string",
            "alarmName": "string"
        }
        ]
    }
    ],
    "nextToken": "string"
}
```

The API function call, DeleteScalingPolicy( ), may take request parameters:

```
{
    "policyName": "string",
    "serviceNamespace": "string",
    "resourceId": "string",
    "scalableDimension": "string"
}
```

The response elements for DeleteScalingPolicy( ) may be:

```
{
    // None
}
```

The API function call, DescribeScalingActivities( ), may take request parameters:

```
{
    "activityIds": ["string"],
    "serviceNamespace": "string",
    "resourceId": "string",
    "scalableDimension": "string",
    "maxResults": "number",
    "nextToken": "string"
}
```

The response elements for DescribeScalingActivities( ) may be:

```
{
    "scalingActivities": [
    {
        "activityId": "string",
        "serviceNamespace": "string",
        "resourceId": "string",
        "scalableDimension": "string",
        "description": "string",
        "cause": "string",
        "startTime": "date-time",
        "endTime": "date-time",
        "details": "string",
        "statusMessage": "string"
        "statusCode": "string",
    }
    ],
    "nextToken": "string"
}
```

Figure 7:
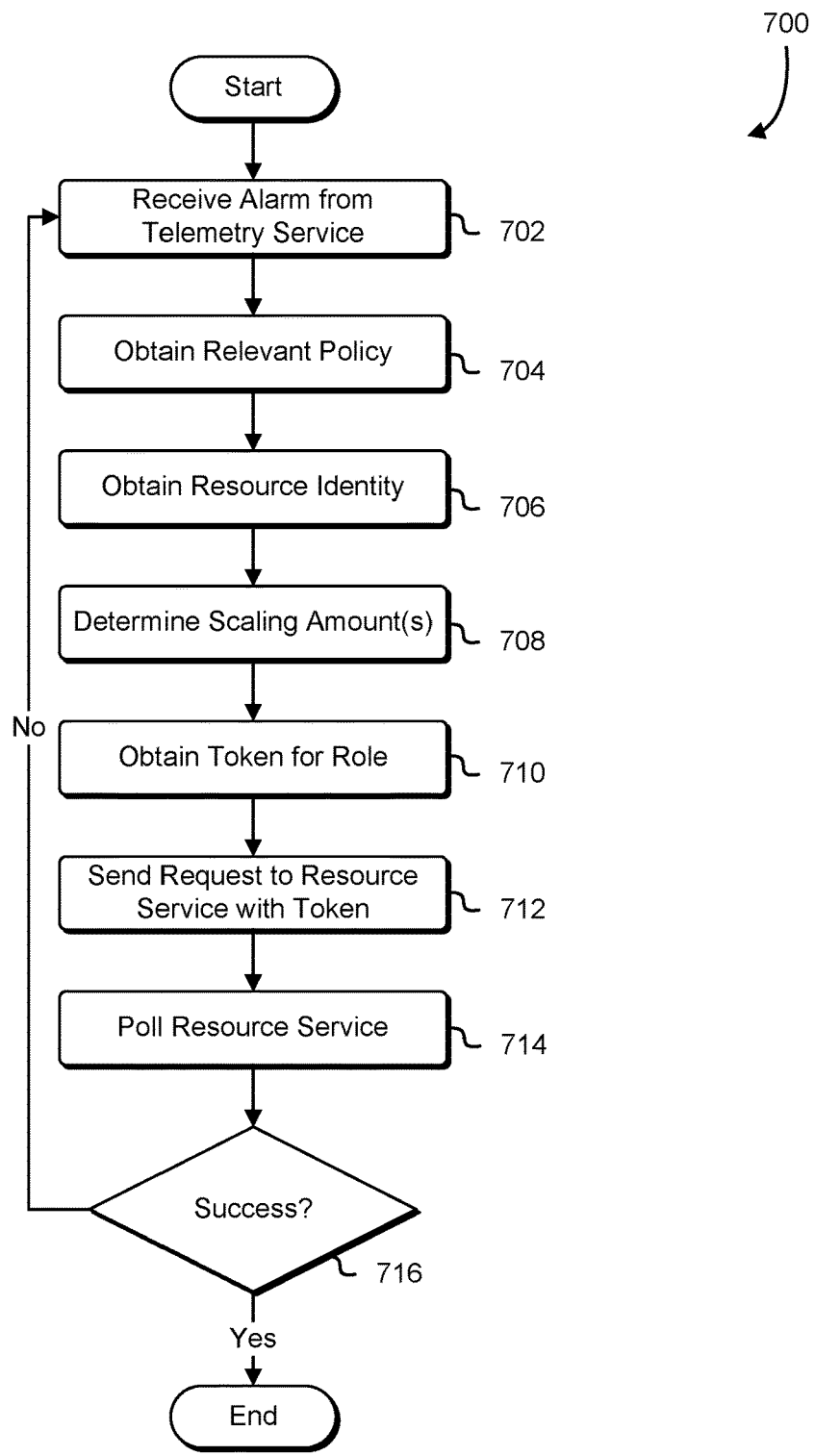
FIG. 7 is a flowchart that illustrates an example workflow of the scaling service in accordance with an embodiment.

FIG. 7 is a flowchart illustrating an example of process 700 for scaling a resource in accordance with various embodiments. Some or all of the process 700 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 700 may be performed by any suitable system, such as a server in a data center, by various components of the example environment 1000 described in conjunction with FIG. 10, such as the web server 1006 or the application server 1008, by multiple computing devices in a distributed system of a computing resource service provider, or by any electronic client device such as the electronic client device 1002. The process 700 includes a series of operations depicting a workflow of the scaling service that occurs in response to receiving an instruction (e.g., via a telemetry service alarm).

In 702, the system performing the process 700 receives an alarm from a telemetry service that has been configured to trigger as a result of a particular measurement reaching a value (e.g., exceeding, falling below, etc.) relative to a threshold. As has been noted in the present disclosure, in some embodiments, scaling policies can be triggered by other notifications from external entities beyond a telemetry service alarm from the telemetry service. In 704, the system obtains the scaling policy that corresponds to the alarm (or other notification) received in 702. As noted, in some implementations the scaling policies are stored in and obtained from a database table of a database service.

In 706, based on the information contained within the scaling policy of 704, the system performing the process 700 determines an identity of the resource to be scaled, the service hosting the resource, and the dimension of the resource to be scaled. In 708, an amount of the scaling dimension to scale is determined from the scaling policy. As noted in the present disclosure, some embodiments implement a cooldown period. If the alarm received in 702 was received during a cooldown period, one or more previous scaling actions may be taken into consideration in the determination of the scaling amount. For example, if a previous scaling action that started the cooldown indicated to scale a capacity down by 10 units, and a subsequent alarm received during the cooldown indicated to scale the capacity down by 5 units, the system may determine that no scaling action need be taken, because the capacity has already been scaled down by 10 units, and 10 units is greater than 5 units. In embodiments, a larger scaling capacity is favored by the system over a smaller scaling capacity for such determinations.

In 710, the role sufficient for fulfillment of the scaling action is determined from the scaling policy, and a token representing session credentials for the role may be obtained from a token service. The system can include the token in scaling requests made to the resource service hosting the resource to be scaled as proof that the system is authorized to have the requests fulfilled.

In 712, the system performing the process 700 makes a request to the resource service (the request including the token obtained in 710) to scale the identified scalable dimension of the identified resource according to an amount and a direction (e.g., up/down) specified in the scaling policy. In 714, the system may periodically poll the resource service for a status or other indication whether the scaling request has succeeded or failed. The system may continue to poll the resource service until an amount of time corresponding to a timeout value is exceeded, whereupon the system may presume that the scaling request has failed. If the system receives an indication that the scaling request has succeeded, failed, or the timeout has been exceeded, the system may proceed to 716.

In 716, the system determines whether the scaling request was successfully fulfilled. If the scaling request was not successfully fulfilled, the system performing the process may return to 702, wherein if the alarm is still in breach the system performing the process 700 may repeat the operations of 702-16. It must be noted, that the system determine that it is unnecessary to repeat certain operations of 704-12. For example, the resource identity and the relevant policy may still be in system memory, so it may be unnecessary to repeat certain operations of 706. Or, the system having already obtained a token that has not yet expired may not need to repeat the operations of 710. On the other hand, in some implementations it is be desirable for the system to return to 704 in case the relevant policy has been changed since last obtained. Likewise in some implementations, it is be desirable to obtain a new token for the role obtained in 710, in case the old token has expired or is otherwise invalid. If the alarm is no longer in breach, the system may determine that it is unnecessary to repeat the scaling action (or presume that, despite a timeout received in 714, that the scaling request was actually successfully fulfilled), and consequently the system may proceed from 702 at this point to end the process 700.

In some cases failure to fulfill the scaling request may result in an error message, such as, "The role specified has insufficient permission for the requested action," in which case the system performing the process 700 may log the error and terminate execution of process 700, since such an error indicates futility of making further attempts to repeat the scaling request. On the other hand, if the scaling request was successfully fulfilled, the system may end of the process 700. Note that one or more of the operations performed in 702-18 may be performed in various orders and combinations, including in parallel.

FIG. 8 illustrates an aspect of an environment 800 in which an embodiment may be practiced. Specifically, FIG. 8 depicts a scaling service 802 configured to request the scaling action 808 from software container service 804 to change a number of tasks 812A-12B running in a service construct of a cluster 832 according to scaling policy 830 in response to receiving an alert (e.g., via the alarm 810) from the telemetry service 806, such as where the alert was triggered by certain measurements 834 of the software container service 804 exceeding a predefined threshold.

The scaling service 802 may be similar to the scaling services 102 and 202 described in conjunction with FIGS. 1 and 2. The software container service 804 may be a software container service such as described U.S. patent application Ser. No. 14/538,663, filed Nov. 11, 2014, entitled "SYSTEM FOR MANAGING AND SCHEDULING CONTAINERS," incorporated by reference. The software container service 804 depicted in FIG. 8 is but one of many types of resource services usable in conjunction with the scaling service 802. The software container service 804 may provide to the telemetry service 806 metrics related to the number of calls to the software container service 804, metrics related to how many services have been scaled up, metrics related to the difference between desired and actual capacity. Also, in some embodiments telemetry service event notifications can also be published in the form of a metric usable with the software container service 804. The telemetry service 806 may be similar to the telemetry services 106 and 206 described in conjunction with FIGS. 1 and 2.

The scaling action 808 may be a request, such as an API request, to increase or decrease a scalable dimension of a resource, such as number of tasks 812A running in a service construct of the cluster 832. Autoscaling actions may update the "desired task count" of the software container service 804. The autoscaling actions may rely on the "desired status" of the tasks 812A running in the software container service 804 in order to determine which tasks should be included in the scale-out or scale-in calculation to determine the next desired task count. In this manner, terminating tasks may be included in the calculation when scale-in is occurring, and tasks in the process of launching may be similarly included in the scale-out calculation. As shown in FIG. 8, the scaling action 808 instructs the software container service 804 to down scale a number of the tasks 812A running in the cluster 832, and as can be seen by the tasks 812B, the number of tasks has been reduced from 6 to 2 in fulfillment of the scaling action 808.

The desired task count may be updated in the software container service 804 regardless of any minimum specified in the scaling configuration. When the next alarm fires: If the alarm 810 is a scale out for the resource, the scaling service 802 may scale out the service to the minimum and then continue to scale out as required based on the scaling policy 830 associated with the alarm 810. If the alarm 810 is a scale in for the resource, the scaling service 802 may not adjust the desired capacity of the scalable resource. The inverse may apply where the customer 826 sets the desired capacity above the maximum defined in the scaling configuration for the service. The alarm 810 may be a telemetry service alarm similar to the alarm 110 described in conjunction with FIG. 1.

The tasks 812A-12B may be software containers of a type described in the present disclosure running in container instances in the cluster 832. A task in the software container service 804 may be the smallest unit of deployment of container engine (e.g., Docker) software containers on a software container service cluster. A software container may be created based on a task definition, which may function as a "blueprint" for an application (e.g., may specify which container engine images to use, how much processor and memory to use with each container, etc.). The customer 826 may be a customer of a computing resource service provider that subscribes to the software container service 804 provided by the computing resource service provider to customers for running software containers.

The scaling policy 830 may be a set of parameters that specify a resource and how to affect scaling for the resource when triggered by the alarm 910. The cluster 832 may be a group of container instances configured to run the tasks 812 for the customer 826. The software container service 804 may keep track of a desired task count (also referred to as "desired count") for a software container service cluster. In some examples, the term "cluster" may refer to a set of one or more container instances that have been registered to (i.e., as being associated with) the cluster 832. Thus, the cluster 832 may be comprised of one or more container instances. In some examples, a "container instance" refer to a virtual machine that is configured to run software containers. The cluster 832 may be associated with an account of the customer 826 of the computing resource service provider that may be providing the software container service 804 to the customer 826 for running software containers.

The software container service cluster 832 may support multiple service constructs, and scaling an underlying automatic scaling group may be a function of all service constructs running in the cluster. The telemetry service 806 may utilize the software container service cluster 832 utilization metrics to allow the customer 826 to easily scale the underlying automatic scaling groups based on measurements of how resources are being utilized. The measurements 834 may be one or more measurements emitted by the software container service 804 that reflect a state of resources of the customer 826. The metrics corresponding to the measurements 834 may include average and minimum number of tasks for a given service that could be scheduled in the cluster.

The customer 826 may use the scaling service 802 to auto-scale a desired task count on service construct of the cluster 832. The customer 826 may provide the following in a scaling policy: name of a service construct, name of the cluster 832 associated with the service construct, minimum and maximum boundaries for desired task count (the boundaries ensure that capacity will be scaled within the specified range and guard against any unintentional excessive scaling), policy/role management service role for the scaling service 802 to access the software container service 804 on the behalf of the customer 826, and/or one or more scaling policies for the service construct, each of which specifies parameters for a scaling action. Parameters for scaling actions may include:

- adjustment type (e.g., absolute change in capacity, percentage change in capacity, exact capacity; note that for software container service 804 task scaling, capacity is number of tasks 812 on the cluster 832);
- scaling adjustment (a number whose meaning depends on the adjustment type);
- min adjustment magnitude (applicable when adjustment type is percentage change in capacity; used in cases where the specified percentage results in a very small adjustment); and
- cooldown (this may allow the customer 826 to give the scaling action 808 an amount of time to take effect before allowing further scaling actions; it starts once the scaling action 808 has been fulfilled).

The customer 826 may register the service construct in the scaling service 802 with the associated cluster 832, minimum and maximum desired task counts, and a policy/role management service role with permissions to call the DescribeServices( ) (to obtain the desired task count) and UpdateService( ) (to modify the desired task count) APIs. As an example, the customer 826 may create a scale out policy and a scale in policy for the service construct. An example of a scale out policy is to increase task count by 10 percent, with minimum increase of 2 tasks, and have a cooldown of 2 minutes. An example of a scale in policy is to decrease task count by 1 task and have a cooldown of 1 minute. Through the scaling service frontend 214, shown in FIG. 2, the customer 826 may attach the scaling policy 830 to one or more alarms of the telemetry service 806 to cause the scaling service 802 to perform the scaling action 808.

The scaling service 802 may address first order requirements of software container service 804 task scaling: defining scaling policies for scaling the desired task count of a service construct, triggering scaling policies by the alarm 810 of the telemetry service 806, and retrieving scaling history of service constructs. Scaling history may be presented as a chronological sequence of scaling activities. An example of scaling activity is:

Service: containerservice
ResourceIdentifier: service/my-cluster/my-service
Description: Increasing desired task count 1
Cause: At 2015-10-06T17:43:07Z monitor alarm my-service-scale-out-alarm in state ALARM triggered policy changing the desired capacity from 1 to 2.
StartTime: 2015-10-06T17:43:10.414Z
EndTime: 2015-10-06T17:44:13.364Z
StatusCode: Successful For the software container service 804, the customer 826 may define scaling policies to scale-up or down the tasks 812 or other scalable dimensions of the service construct, and the customer 826 may set up the alarm 810 of the telemetry service 806 on a metric relevant to the service construct. Triggering of the alarm 810 would cause the scaling service 802 to execute the scaling policy 830 corresponding to the alarm. In this manner, autoscaling of a number of the tasks 812 for the service construct, without manual intervention by the customer 826 to explicitly set the number of the tasks 812, may be performed.

As noted, the scaling service 802 is agnostic regarding the metric that the customer 826 associates with the alarm 810 for invoking a scaling policy. That is, the customer 826 may associate any metric with any alarm, even metrics from other resource services, and have the alarm 810 trigger any scaling policy. Therefore, the metric used by the customer 826 is not dictated by the scaling service 802. Typically, however, the customer 826 would likely use a metric associated with the software container service 804, although the customer 826 is not required to do so. Software container service metrics emitted by a software container that usable by the customer 826 to set up alarms may include processor utilization metrics and memory utilization metrics. Such metrics may be measured/aggregated on a per service construct, per container instance, per cluster, or per task basis.

In implementations where the software container service 804 operates in conjunction with an application load balancer, the application load balancer also emits metrics to the telemetry service 806 which the customer 826 may use for configuring the alarm 810 to trigger policies for scaling software container service containers. For example, the customer 826 may configure, to scale software container service resources, the alarm 810 to trigger if a request rate to the application load balancer is above a certain threshold.

As noted, a scalable dimension for service construct may be a number of the tasks 812 running in a service construct cluster. In some examples, a "task" may refer to a process being executed within one or more software containers, and a "task definition" may define how a set of tasks for software containers should be launched. The task definition may be written in various formats, such as JavaScript Object Notation (JSON) or Extensible Markup Language (XML). The task definition may specify: locations of software images for the set of tasks, amount of memory and/or amount of processing power to be allocated from the host to the specified software containers, disk, network locations, and other resources that the software containers should share with each other, how a set of software containers should be associated with each other, and/or information for scheduling the set of tasks. The task definition may be stored in a task definition file. In some examples, a "task definition file" may be a file containing the task definition for a set of software containers that are assigned to start as a group.

As noted, one or more software containers may run within a container instance. The more such instances the customer 826 has in a cluster, the more application load the customer's resources will be able to handle. The scaling service 802 and telemetry service 806 may interact with the software container service 804, as one of the resource services 204 of FIG. 2, by allowing the customer 826 to specify the alarm 810 to trigger as a result of certain conditions about a specified metric being met. The measurements 834 are received and aggregated by the telemetry service 806 may include processor usage, memory usage, a number of messages being pulled off of a message queuing service queue, queue size of the message queuing service queue, and so on.

The customer 826 specifies that when the alarm 810 is triggered, the telemetry service 806 will send a notification to the scaling service 802. The customer 826 and then defines parameters (e.g., scale-up by X % from the current capacity, which, for a service construct, may be the current number of the tasks 812). The customer 826 associates the scaling policy 830 with the alarm 810 as part of the alarm 810 action. In this manner, receipt of the notification from the telemetry service 806 will then cause the scaling service 202 to execute. The scaling service 802 may perform calculations to determine, given the current number of the tasks 812 and the X % to be scaled, what new number of the tasks 812 the service construct should step to. Once this number is determined, the scaling service 802 may send an API call to the software container service 804 requesting to change the number of the tasks 812 to the amount determined. The service construct will be aware of the number of current tasks 812A and be able to determine how many additional tasks will need to be launched in order to arrive at the desired number.

Note that the scaling service 802 may not select specifically how the resource should be scaled, only that a dimension of the resource should be scaled up or down. For example, for scaling down the tasks 812 of the software container service 804, the scaling service 802 instructs the software container service 804 simply to scale-down the number of the tasks 812 in service construct of a cluster. However, the scaling service 802 does not choose which of the tasks 812 are to be terminated; the software container service 804 itself may implement termination policies along with zone-balancing behavior to determine which of the tasks 812 to terminate.

Automatic scaling for the software container service 804 may rely on a virtual computing system service to terminate virtual machine instances. For example, if the scaling service 802 directs the service construct to scale-down instances, or enough of the tasks 812 as to make a number of the instances superfluous, the actual determination of which instances to terminate and the process of terminating the instances would be performed by the virtual computing system service itself rather than the scaling service 802. For example, the service construct can deprovision the tasks 812 from specific instances before they are terminated by virtual computing system service. This process may be transparent to the customer 826 of the software container service.

In embodiments, the scaling service 802 may handle concurrent scaling actions. An example of concurrent scaling actions for a software container service is shown below:

If the scaling service 802 is scaling out, the scaling service 802 may only change the desired task count if the current value of the desired task count is less than the new one. In other words, the scaling service 802 may favor a larger scale over a smaller one. Take for example, a situation where two scale-out policies P1 and P2 are triggered on the same service construct within seconds of each other. In this example, P1 is specified to increase the desired task count by 10%, while P2 is specified to increase the desired task count by 20%. Assuming both the current desired and running count are 10 and assuming P1 is executed first, the scaling service 802 will set the desired task count to 11. Thus, depending on timing, P2 may see the running count being 10 and desired 11. When P2 is executed, the new desired task count will be calculated as 12 (10+10*20%), and, thus, the desired task count will be set to 12, because 12 is greater than 11. Conversely, if P2 is executed first, it will set the desired task count to 12, but P1, when executed, will not set the desired task count to 11 because 11 is smaller than 12.

Similarly, if the scaling service 802 is scaling in, the scaling service 802 may only change the desired task count if current value of the desired task count is greater than the new one. In other words, the system will again favor a larger scale in to a smaller one.

Figure 9:
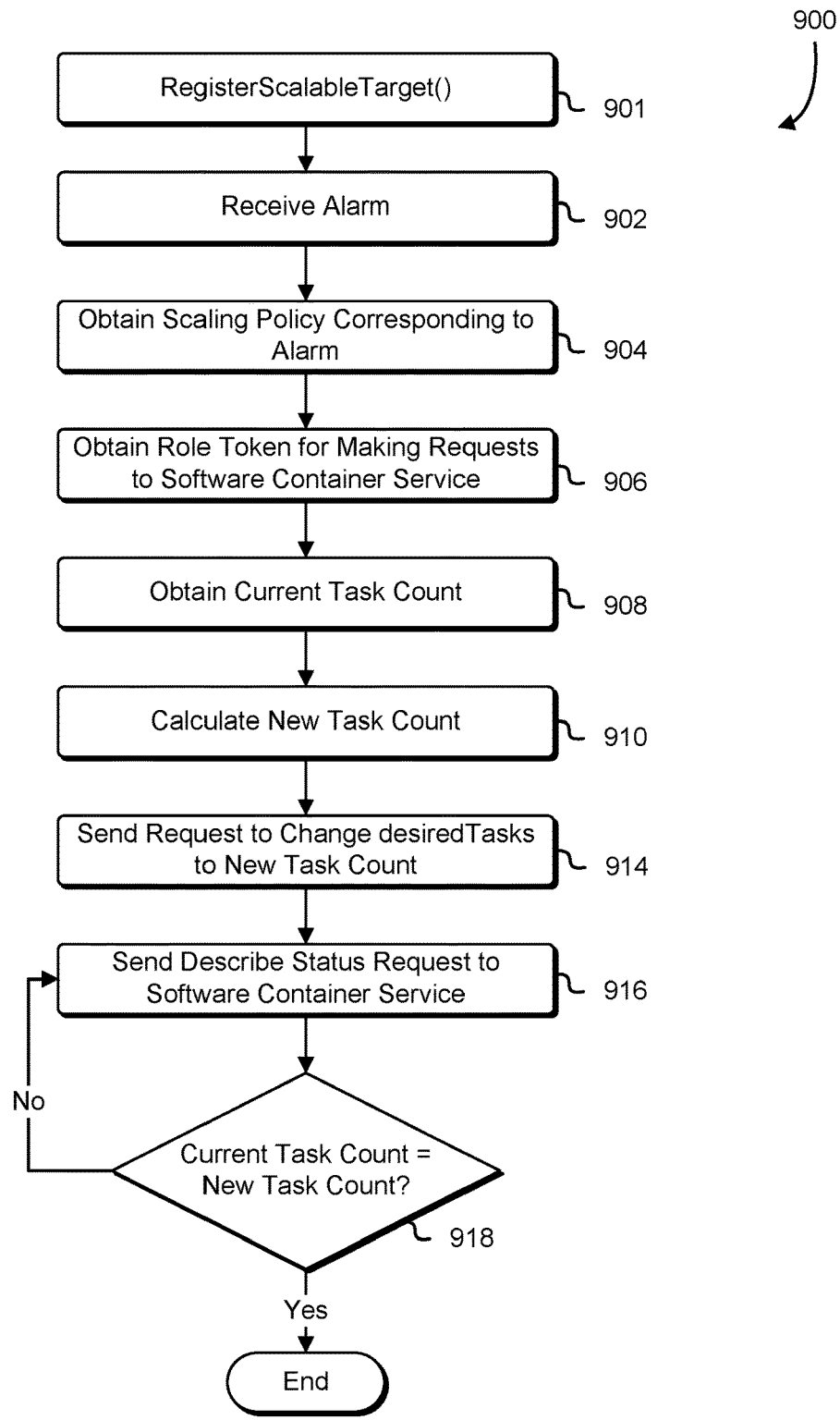
FIG. 9 is a flowchart that illustrates an example of scaling a software container service in accordance with an embodiment.

FIG. 9 is a flowchart illustrating an example of a process 900 for scaling a container service in accordance with various embodiments. Some or all of the process 900 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 900 may be performed by any suitable system, such as a server in a data center, by various components of the example environment 1000 described in conjunction with FIG. 10, such as the web server 1006 or the application server 1008, by multiple computing devices in a distributed system of a computing resource service provider, or by any electronic client device such as the electronic client device 1002. The process 900 includes a series of operations wherein an alarm is received that triggers execution of a corresponding scaling policy for a software container service, the current task count of containers running in service construct of the cluster is obtained, a new task count is calculated based on the scaling policy, and a request is made to scale the tasks in the service construct to correspond to the new task count.

In 901, the system receives a request from a customer to register a scalable target (e.g., the service construct of a cluster owned by the customer). In 902, the system performing the process receives an alarm, such as from a telemetry service aggregating metrics corresponding to the software container service, or some other metrics. As noted, although an alarm is illustrated in the process of FIG. 9, other external notifications may be supported (e.g., on-demand by a customer, notification in response to the occurrence of an event, a notification sent according to a schedule, etc.). In 904, the system obtains a scaling policy that corresponds to the alarm received in 902.

In 906, the system performing the process 900 obtain a token from a token service representing a role from a policy/role management service/authorization service that the system may include with requests to the software container service that authorizes the system to have the requests fulfilled. In 908, from the scaling policy, the system performing the process 900 can obtain an identity of the resource associated with the scaling policy (i.e., the scalable target registered in 901); in this case, a service construct of a cluster of the software container service assigned to the customer that configured the alarm and the scaling policy. Having the identity of the service construct, the system may make a request, including the token obtained in 906, to the software container service for a current task count running in the service construct.

In 910, based on the scaling policy and the current task count, the system may calculate a new task count, thereby determining the scaling action. For example if the new task count is greater than the current task count, the scaling action may be to scale up the running tasks by an amount corresponding to the difference between the task counts. Likewise, if the new task count is less than the current task count, the scaling action may be to scale down the running tasks by an amount corresponding to the difference between this task count.

In 914, the system performing the process sends a request, including the token obtained in 906, to the software container service to set the desired tasks of the service construct to match the calculated new task count. Then, in 916, the system begins polling the software container service, using the token obtained in 906, for a status that includes a current task count. In 918, the system performing the process 900 compares the current task count with the calculated new task count, and if the current and new task counts are different, the system may return to 916 to repeat the polling until a timeout occurs. Otherwise, if the current task count matches the new task count, the system may determine that the scaling action has been successfully fulfilled and in the process 900. Note that one or more of the operations performed in 902-18 may be performed in various orders and combinations, including in parallel.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network 1004 can include any appropriate network, including an intranet, the Internet, a cellular network, a local area network, a satellite network or any other network and/or combination thereof. Components used for such a system can depend at least in part upon the type of network and/or environment selected. Many protocols and components for communicating via such a network are well known and will not be discussed in detail. Communication over the network 1004 can be enabled by wired or wireless connections and combinations thereof. In this example, the network 1004 includes the Internet and/or other publicly-addressable communications network, as the environment includes a web server 1006 for receiving requests and serving content in response thereto, although for other networks an alternative device serving a similar purpose could be used as would be apparent to one of ordinary skill in the art.

The illustrative environment includes an application server 1008 and a data store 1010. It should be understood that there could be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server 1008 can include any appropriate hardware, software and firmware for integrating with the data store 1010 as needed to execute aspects of one or more applications for the electronic client device 1002, handling some or all of the data access and business logic for an application. The application server 1008 may provide access control services in cooperation with the data store 1010 and is able to generate content including, text, graphics, audio, video and/or other content usable to be provided to the user, which may be served to the user by the web server 1006 in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the electronic client device 1002 to provide the content in one or more forms including, forms that are perceptible to the user audibly, visually and/or through other senses. The handling of all requests and responses, as well as the delivery of content between the electronic client device 1002 and the application server 1008, can be handled by the web server 1006 using PHP: Hypertext Preprocessor ("PHP"), Python, Ruby, Perl, Java, HTML, XML, JSON, and/or another appropriate server-side structured language in this example. Further, operations described as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store 1010 may include mechanisms for storing production data 1012 and user information 1016, which can be used to serve content for the production side. The data store 1010 also is shown to include a mechanism for storing log data 1014, which can be used for reporting, analysis or other purposes. It should be understood that there can be many other aspects that may need to be stored in the data store 1010, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services, and other applications may be generated by server-side structured languages as described or may be provided by a content management system ("CMS") operating on, or under the control of, the application server 1008. In one example, a user, through a device operated by the user, might submit a search request for a certain type of item. In this case, the data store 1010 might access the user information 1016 to verify the identity of the user and can access the catalog detail information to obtain information about items of that type. The information then can be returned to the user, such as in a results listing on a web page that the user is able to view via a browser on the electronic client device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the example environment 1000 in FIG. 10 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network 1004 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, Mongodatabase, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network 1004. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A system, comprising a scaling service that includes one or more processors and memory including first instructions that, as a result of execution by the one or more processors, cause the scaling service to:
    register, as a scalable target, a dimension of quantity of running software containers in a resource of a software container service, the dimension being a number of running software containers;
    in response to receipt of a notification associated with a scaling policy, obtain the scaling policy;
    submit a first request to a software container service, the first request being a request for a first count of software containers in the resource;
    calculate, based at least in part on the scaling policy and the first count, a desired count of software containers for the resource;
    submit a second request to the software container service, the second request being a request to change the scalable target to meet the desired count;
    obtain, in response to a third request to the software container service, a second count of running software containers; and
    make, based at least in part on a comparison between the second count and the desired count, a determination whether the second request has been fulfilled.

2. The system of claim 1, the system further comprising the software container service that includes one or more processors and second memory including second instructions that, as a result of execution by the one or more processors, cause the software container service to:
    in response to receipt of the first request, provide the number of running software containers at a first time as the first count; and
    in response to receipt of the second request, initiate a process for setting the number of running software containers to the desired count.

3. The system of claim 2, wherein the second instructions further include instructions that cause the software container service to, in response to receipt of the third request, provide the number of running software containers at a second time as the second count.

4. The system of claim 2, wherein:
the system further comprises a telemetry service that includes one or more processors and third memory including third instructions that, as a result of execution by the one or more processors, cause the telemetry service to:
receive, from a customer associated with the running software containers, a set of criteria for triggering an alarm, the set of criteria relating to metrics reflecting usage of the running software containers;
receive, from the software container service, the metrics; and
as a result of the metrics meeting the set of criteria, provide, to the scaling service, the notification; and
the second instructions include instructions that further cause the software container service to provide the metrics to the telemetry service.

5. The system of claim 1, wherein:
the first instructions further include instructions that cause the scaling service to obtain a token associated with a security role that allows the software container service to fulfill requests to change the number of running software containers in the resource; and
the second request includes the token.

6. The system of claim 5, wherein:
the security role is created at an authentication service;
the token is generated by a token service to represent session credentials associated with the security role; and
including the token with the second request indicates that the scaling service has been granted permission to have the second request fulfilled.

7. The system of claim 1, wherein the resource of the software container service is a group of containers specified to run as an application service by a customer of a computing resource service provider that provides the software container service.

8. A computer-implemented method, comprising:
under the control of one or more computer systems that execute instructions,
obtaining a scaling policy associated with a notification received by the one or more computer systems;
submitting a first request, to a software container service, for a first current capacity of a resource;
calculating, based at least in part on the scaling policy and the first current capacity, an amount by which to adjust a capacity of the resource;
submitting a second request, to the software container service, to adjust the capacity of the resource by the amount;
submitting a third request, to the software container service, for a second current capacity of the resource;
receiving the second current capacity from the software container service; and
determining, based at least in part on a comparison between the second current capacity and the amount, whether the second request has been fulfilled.

9. The computer-implemented method of claim 8, wherein:
the resource is a set of running software containers; and
the capacity is a quantity of running software containers in the set.

10. The computer-implemented method of claim 8, wherein:
the resource is a set of software containers that run as an application service for a customer of a computing resource service provider that provides the software container service; and
the method further comprises registering a scalable dimension of the resource as a scalable target of the scaling policy.

11. The computer-implemented method of claim 8, wherein:
the method further comprises obtaining a token usable for causing a request to the software container service to be fulfilled, the token representing session credentials associated with a role for authorizing fulfilment of requests to the software container service; and
the first request, the second request, and the third request include the token.

12. The computer-implemented method of claim 8, wherein the scaling policy includes a set of parameters that indicates:
the resource of the software container service to be scaled; and
a magnitude that the resource is to be scaled as a result of receiving the notification.

13. The computer-implemented method of claim 8, further comprising receiving, from a customer of a computing resource service provider that provides the software container service, the scaling policy, the scaling policy including a parameter that associates the scaling policy with a source of the notification.

14. The computer-implemented method of claim 8, wherein the capacity is a quantity of software containers running in a group of container instances.

15. The computer-implemented method of claim 8, wherein the notification:
is received from a telemetry service; and
indicates that metrics have met criteria to trigger an alarm.

16. The computer-implemented method of claim 15, wherein:
the software container service operates in conjunction with an application load balancer that emits load balancer metrics to the telemetry service; and
the alarm is triggered based at least in part on the load balancer metrics reaching a value relative to a threshold.

17. A non-transitory computer-readable storage medium having stored thereon executable instructions that, as a result of being executed by one or more processors of a computer system, cause the computer system to at least:
register a set of software containers of a resource service and a policy for scaling the set of software containers;
receive a notification associated with the policy;
obtain a token that allows requests to change a quantity of the set of software containers;
submit, to the resource service specified by the policy, a first request, the first request being for an indication of a first quantity of the set of software containers specified by the policy;
calculate, based at least in part on the policy and the first quantity, an adjustment to the first quantity;
submit, to the resource service, a second request, the second request being a request to adjust the first quantity of the set of software containers by an amount corresponding to the adjustment;

obtain, in response to a third request to the resource service, a second quantity of the set of software containers; and provide, based at least in part on a comparison between the second quantity and the amount, output that indicates whether the second request has been fulfilled.

18. The non-transitory computer-readable storage medium of claim 17, wherein the notification is received as a result of conditions for an alarm having been met.

19. The non-transitory computer-readable storage medium of claim 17, wherein the notification is received from an entity that is not managed by a computing resource service provider that hosts the computer system.

20. The non-transitory computer-readable storage medium of claim 17, wherein the notification is received:
   as a result of a metric that reflects usage of a resource reaching a value relative to a threshold,
   as a result of an occurrence of an event specified by a customer of a computing resource service provider that hosts the computer system,
   according to a predetermined schedule, or
   in response to a command by the customer to execute the policy.

21. The non-transitory computer-readable storage medium of claim 17, wherein the first and second requests are submitted via application programming interface calls of the resource service.

22. The non-transitory computer-readable storage medium of claim 17, wherein metadata of past scaling actions are logged, the metadata including one or more of:
   an activity identifier for a scaling action,
   a uniform resource name of the set of software containers,
   a description for the scaling action,
   a start time for the scaling action, or
   a result of requesting the scaling action.

23. The non-transitory computer-readable storage medium of claim 17, wherein:
   the adjustment is a first adjustment; and
   the executable instructions include executable instructions that further cause the computer system to at least:
      receive a second notification associated with the policy within a predetermined cool down period from submission of the second request;
      calculate, based at least in part on the policy, a second adjustment, and adjusting an amount of the second adjustment based at least in part on the first adjustment; and
      submit, to the resource service, a fourth request, the fourth request being a request to adjust the quantity of the set of software containers by an amount corresponding to the second adjustment.

* * * * *